US012632163B2

(12) United States Patent
Saito et al.

(10) Patent No.: US 12,632,163 B2
(45) Date of Patent: May 19, 2026

(54) CLOUD SYSTEM, AGGREGATED RESULT DISPLAY METHOD, AND INFORMATION STORAGE MEDIUM

(71) Applicant: Cybozu, Inc., Tokyo (JP)

(72) Inventors: Yuta Saito, Saitama (JP); Hirotaka Ikoma, Fukuoka (JP); Ryosuke Oshida, Chigasaki (JP); Manabu Toyama, Tokyo (JP); Ken Hamada, Kyoto (JP)

(73) Assignee: CYBOZU, INC., Tokyo (JP)

( * ) Notice: Subject to any disclaimer, the term of this patent is extended or adjusted under 35 U.S.C. 154(b) by 332 days.

(21) Appl. No.: 17/956,836

(22) Filed: Sep. 30, 2022

(65) Prior Publication Data

US 2023/0305691 A1　Sep. 28, 2023

(30) Foreign Application Priority Data

Mar. 23, 2022　(JP) ................................. 2022-046954

(51) Int. Cl.
　*G06F 3/04847*　(2022.01)
　*G06F 3/0486*　(2013.01)
(52) U.S. Cl.
　CPC ........ *G06F 3/04847* (2013.01); *G06F 3/0486* (2013.01)
(58) Field of Classification Search
　CPC .. G06F 3/04847; G06F 3/0486; G06F 3/0482; G06F 16/244
　See application file for complete search history.

(56) References Cited

U.S. PATENT DOCUMENTS

| | | | |
|---|---|---|---|
| 11,714,823 B1 * | 8/2023 | Breeden | G06F 16/24556 |
| | | | 707/602 |
| 2003/0065638 A1 * | 4/2003 | Robert | G06F 40/143 |

(Continued)

FOREIGN PATENT DOCUMENTS

| | | |
|---|---|---|
| JP | 2016531336 A | 10/2016 |
| WO | 2014200837 A2 | 12/2014 |

OTHER PUBLICATIONS

Yuko Ozaki, Hiroko Hibana & Dekiru-Series Editorial Department, Dekiru Encyclopedia Excel 2016, 1st Edition, Impress Corporation, Oct. 1, 2016, pp. 678-684 (for concise explanation of relevance see the partial translation of the office action for the corresponding JP Patent Application 2022-046954).

(Continued)

*Primary Examiner* — Reji Kartholy
(74) *Attorney, Agent, or Firm* — HEA Law PLLC

(57) ABSTRACT

Provided is a cloud system which allows aggregation of data in a cloud service. At least one processor sets a plurality of setting values relating to the aggregation based on a predetermined setting operation performed on an aggregation screen relating to the aggregation. The at least one processor displays, on the aggregation screen, aggregated results corresponding to the plurality of setting values and an order relating to the plurality of setting values. The at least one processor changes the order based on a predetermined change operation performed on the aggregation screen. When the order is changed, the at least one processor updates the aggregation screen so that the aggregated results corresponding to the changed order are displayed.

17 Claims, 13 Drawing Sheets

(56)         References Cited

U.S. PATENT DOCUMENTS

| | | | | |
|---|---|---|---|---|
| 2009/0043714 A1* | 2/2009 | Zhao | ..................... | G06F 16/904 |
| | | | | 706/11 |
| 2014/0282166 A1* | 9/2014 | Temkin | .............. | G06F 3/04845 |
| | | | | 715/769 |
| 2014/0380219 A1* | 12/2014 | Cartan | ................. | G06F 3/0484 |
| | | | | 715/771 |
| 2016/0117371 A1* | 4/2016 | Couris | ................. | G06F 16/282 |
| | | | | 707/602 |
| 2019/0042635 A1* | 2/2019 | Kim | .................... | G06F 16/2453 |
| 2021/0326339 A1* | 10/2021 | Sherman | ............. | G06F 16/2423 |
| 2022/0382443 A1* | 12/2022 | Clarke | ................. | G06F 3/0482 |
| 2023/0144009 A1* | 5/2023 | Andersen | ............... | G06F 40/14 |
| | | | | 715/237 |

OTHER PUBLICATIONS

Office Action of May 9, 2023, for corresponding JP Patent Application No. 2022-046954, pp. 1 and 2; with Partial translation.

* cited by examiner

| APP NAME | RECORD DATA | | | | | | | |
|---|---|---|---|---|---|---|---|---|
| | No | MANAGEMENT NUMBER | TITLE OF INVENTION | COUN-TRY | APPLICATION TYPE | REQUEST DATE | FILING DATE | ... |
| APPLICATION MANAGEMENT APP | 1 | 1000 | INFORMATION PROCESSING SYSTEM | JP | PATENT | 2022/2/4 | 2022/3/10 | ... |
| | 2 | 1001 | DISPLAY CONTROL DEVICE | JP | PATENT | 2022/2/8 | 2022/2/28 | ... |
| | 3 | 1002 | CLOUD SYSTEM | US | PATENT | 2022/2/10 | 2022/3/15 | ... |
| | 4 | 1003 | DISPLAY IMAGE | JP | DESIGN | 2022/2/15 | – | ... |
| | : | : | : | : | : | : | : | : |
| | : | : | : | : | : | : | : | : |

CLOUD SYSTEM, AGGREGATED RESULT DISPLAY METHOD, AND INFORMATION STORAGE MEDIUM

CROSS-REFERENCE TO RELATED APPLICATION

The present disclosure contains subject matter related to that disclosed in Japanese Patent Application JP 2022-046954 filed in the Japan Patent Office on Mar. 23, 2022 the entire contents of which are hereby incorporated by reference.

BACKGROUND OF THE INVENTION

1. Field of the Invention

The embodiments disclosed herein relate to a cloud system, an aggregated result display method, and an information storage medium.

2. Description of the Related Art

Hitherto, there has been known a cloud system capable of aggregating data in a cloud service. For example, in JP 2016-531336 A, there is described a cloud system capable of displaying a graph generated by aggregating data included in a spreadsheet as a data object on a grid structure of the spreadsheet provided by the cloud service.

SUMMARY OF THE INVENTION

For example, when a graph on the screen is to be displayed by the cloud system of JP 2016-531336 A, a user sets a setting value relating to aggregation of data. This point is the same for cloud systems other than that of JP 2016-531336 A, and the same applies to a case of displaying aggregated results in a form other than a graph. When data included in a table for managing, for example, an order date and an order amount of an order received by a certain company is to be aggregated for each order date, the user sets the "order date" as the setting value of an item for classifying the data. When a plurality of setting values are to be set, the display of the aggregated results is also affected by order positions of the setting values, such as a major item, an intermediate item, and a minor item.

However, with the related-art technology, in order to interchange the order positions relating to the plurality of setting values, the user is required to input the individual setting values again. For example, it is assumed that the user inputs "X" as the setting value of the major item and inputs "Y" as the setting value of the intermediate item. In order to interchange the order positions of those items, the user is required to perform two operations, that is, an operation for changing the setting value of the major item to "Y" and an operation for changing the setting value of the intermediate item to "X". Accordingly, with the related-art technology, the operation of the user is complicated.

An object of the present disclosure is to alleviate an operation load on a user in a cloud service.

According to at least one aspect of the present disclosure, there is provided a cloud system, which allows aggregation of data in a cloud service, the cloud system including at least one processor configured to: set a plurality of setting values relating to the aggregation based on a predetermined setting operation performed on an aggregation screen relating to the aggregation; display, on the aggregation screen, aggregated results corresponding to the plurality of setting values and an order relating to the plurality of setting values; change the order based on a predetermined change operation performed on the aggregation screen; and update, when the order is changed, the aggregation screen so that the aggregated results corresponding to the changed order are displayed.

BRIEF DESCRIPTION OF THE DRAWINGS

FIG. 10 is a table for showing a data storage example of an app database.

DESCRIPTION OF THE EMBODIMENTS

1. Overall Configuration of Cloud System

Figure 1:
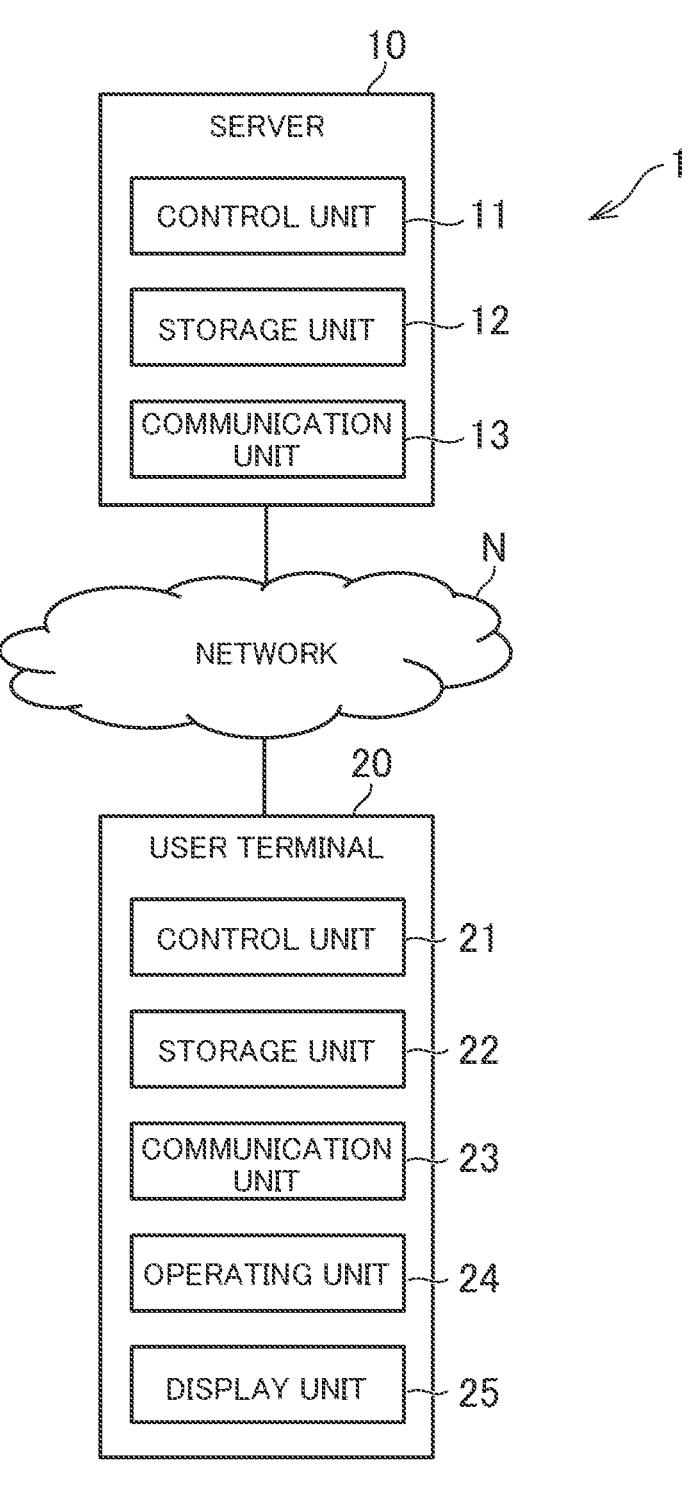
FIG. 1 is a diagram for illustrating an example of an overall configuration of a cloud system.

An example of a cloud system according to at least one embodiment of the present disclosure is described. FIG. 1 is a diagram for illustrating an example of an overall configuration of the cloud system. For example, the cloud system 1 includes a server 10 and a user terminal 20. The server 10 and the user terminal 20 are each connected to a network N, such as the Internet or a LAN. It suffices that the cloud system 1 includes at least one computer, and the cloud system 1 is not limited to the example of FIG. 1.

The server 10 is a server computer. A control unit 11 includes at least one processor. A storage unit 12 includes a volatile memory such as a RAM, and a non-volatile memory such as a flash memory. A communication unit 13 includes at least one of a communication interface for wired communication or a communication interface for wireless communication.

The user terminal 20 is a computer of a user. For example, the user terminal 20 is a personal computer, a tablet terminal, or a smartphone. Hardware configurations of a control unit 21, a storage unit 22, and a communication unit 23 may be the same as those of the control unit 11, the storage unit 12, and the communication unit 13, respectively. An operating unit 24 is an input device, such as a mouse, a touch panel, or a keyboard. A display unit 25 is a liquid crystal display or an organic EL display.

Programs stored in the storage units 12 and 22 may be supplied through the network N. Hardware configurations of the server 10 and the user terminal 20 are not limited to the examples of FIG. 1. For example, a reading unit (for example, optical disc drive or memory card slot) for reading a computer-readable information storage medium or an input/output unit (for example, USB terminal) for directly connecting to an external device may be included. In this case, programs or data stored in the information storage medium may be supplied through intermediation of the reading unit or the input/output unit.

2. Outline of Cloud System

The cloud system 1 can aggregate data in a cloud service. In the at least one embodiment, as an example of the cloud service, a task support service that supports a user in tasks in an organization, such as a company or a government office, is taken as an example. For example, the user uses the cloud service to communicate to/from another user and to keep track of a schedule of another user.

In the at least one embodiment, a situation in which the user uses an app of the cloud service is taken as an example. The app is a kind of database in which various kinds of data can be registered. For example, the app has a database function for registering, viewing, or searching data and a communication function for smooth progress of tasks. For example, when the user logs in to the cloud service, an app screen for using the app is displayed on the display unit 25.

Figure 2:
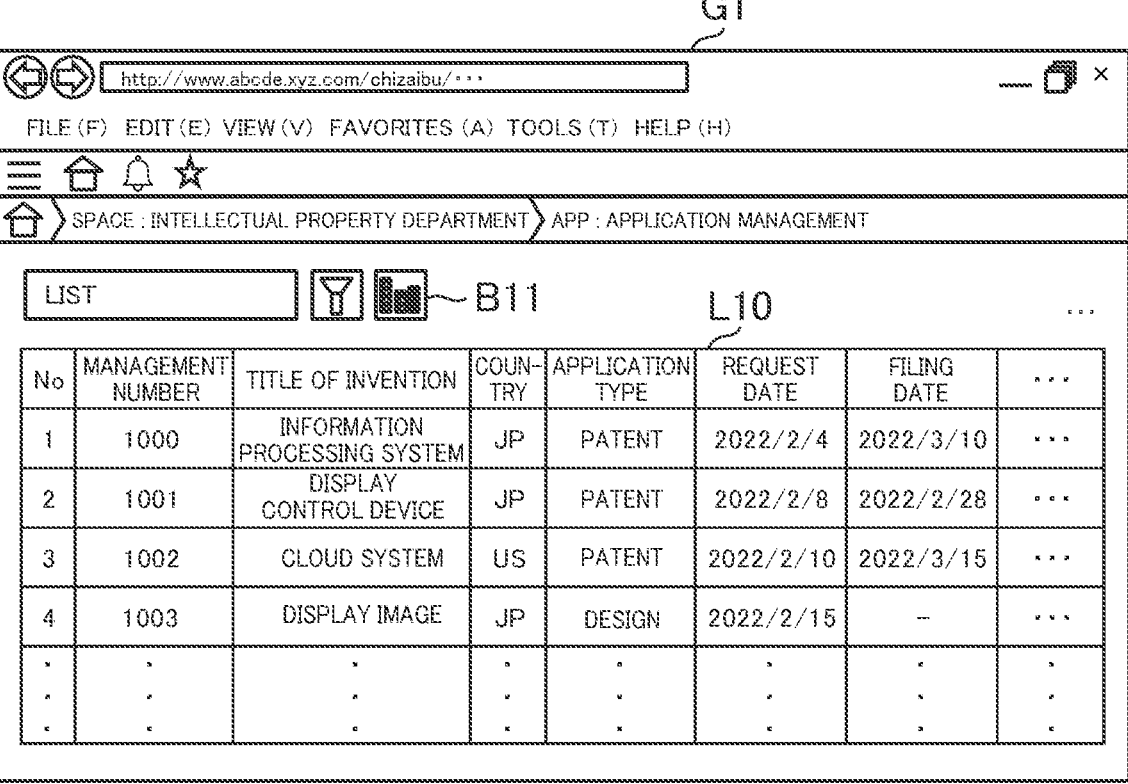
FIG. 2 is a view for illustrating an example of an app screen.

FIG. 2 is a view for illustrating an example of the app screen. In the at least one embodiment, an application management app created for managing applications to patent offices is taken as an example, but any one of apps created for various other purposes can be used. For example, on an app screen G1, a record list L10 for showing a list of records is displayed. The record is a set of pieces of data input in fields. The fields are individual items that form each record.

In the example of FIG. 2, a row in the record list L10 corresponds to a record. For example, a record corresponds to an individual application to a patent office. A column in the record list L10 corresponds to a field. For example, items including "No.," "MANAGEMENT NUMBER," "TITLE OF INVENTION," "COUNTRY," "APPLICATION TYPE," "REQUEST DATE," and "FILING DATE" correspond to the fields. For example, the user authorized to edit can change a value of any field in a record.

The app in the at least one embodiment also includes data hidden in the record list L10, unlike a simple table. For example, when the user selects a certain record, various kinds of data relating to the certain record can be displayed on the app screen G1. For example, an application document file, a document file sent from a patent office, a comment exchanged between users, and other pieces of data hidden in the record list L10 are also registered in the app.

The cloud system 1 can aggregate various kinds of data registered in the app. In the at least one embodiment, a vertical bar graph is described as an example of a display method for aggregated results, but as the display method itself for aggregated results, various other display methods can be used. For example, the cloud system 1 may display aggregated results through use of a horizontal bar graph, a pie graph, a line graph, a cross tabulation table, a table, an area graph, a curve graph, a curved surface graph, or a three-dimensional graph. For example, when the user selects a graph button B11, a preview screen is displayed on the display unit 25. The type of graph or the like may be selected before the preview screen is displayed.

Figure 3:
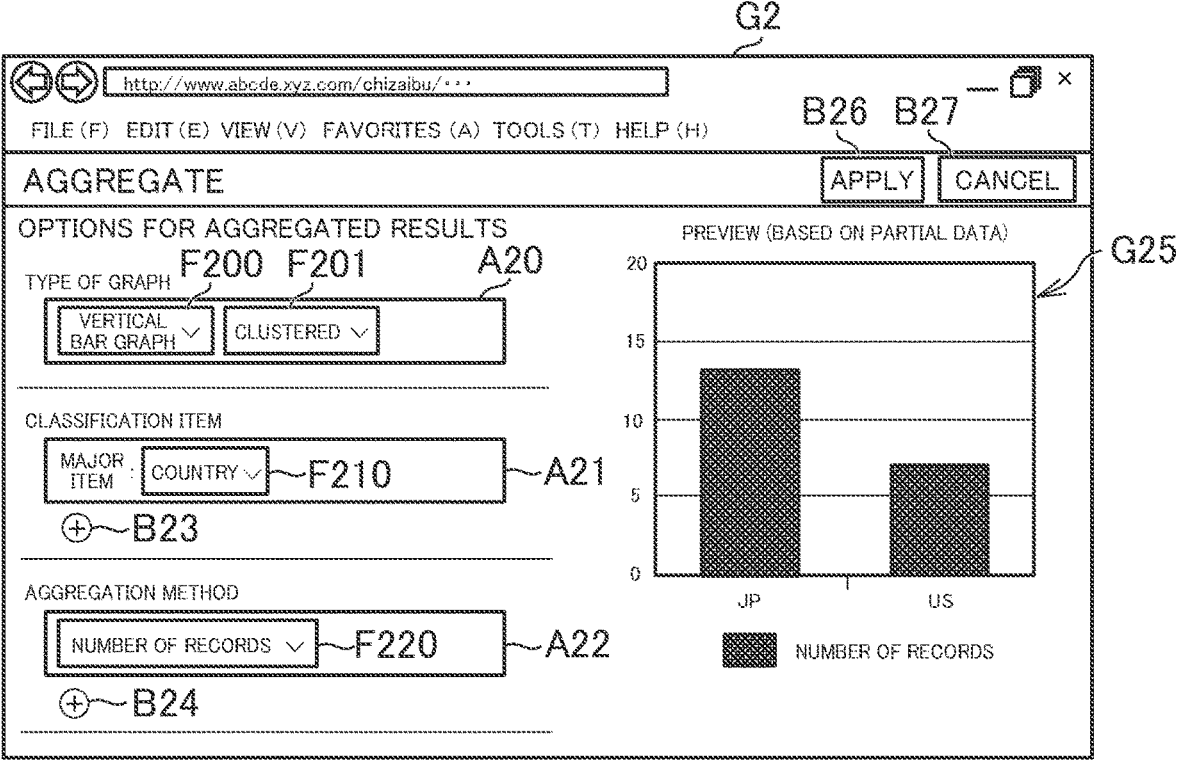
FIG. 3 is a view for illustrating an example of a preview screen.

FIG. 3 is a view for illustrating an example of the preview screen. In the at least one embodiment, the user determines a setting value relating to aggregation with reference to provisional aggregated results using only a part of the data registered in the app. After that, the user can display the true aggregated results using more data. A preview screen G2 is a screen for the user to determine the setting value. On the preview screen G2, it is only required to roughly grasp how the aggregated results are displayed, and hence there is no particular problem even when only a part of the data is used to aggregate data.

In the at least one embodiment, as the setting value to be set by the user, a setting value of an "item to be classified" (hereinafter referred to simply as "classification item") is mainly described. The classification item indicates based on which the data of the app is to be aggregated. For example, when the user wishes to aggregate the data based on the field "COUNTRY," "COUNTRY" is set as the setting value of the classification item as in an input form F210 of FIG. 3. This setting value may be input in advance by default. In the case of FIG. 3, a vertical bar graph G25 is displayed so as to show the aggregated results obtained by aggregating the data of the app based on the field "COUNTRY."

For example, it is assumed that two values "JP" and "US" are input to the field "COUNTRY." In this case, the number of records having "JP" input in the field "COUNTRY" and the number of records having "US" input in the field "COUNTRY" are aggregated. In the example of FIG. 3, the characters "JP" and "US," which are the two values that can be assumed by the field "COUNTRY," are displayed below a horizontal axis of the vertical bar graph G25. Above those characters, bar-shaped images having lengths corresponding to the aggregated numbers of records are displayed. Information including labels of legends of the vertical bar graph G25 and a scale of a vertical axis are also as illustrated in FIG. 3.

For example, when the user selects the input form F210, other candidates that can be set as the setting value of the classification item are displayed in a pull-down menu. Candidates for the setting value are pieces of information that can be conditions for the aggregation, and various candidates can be used. For example, the candidate for the setting value may be a name of a field, a date and time at which data was updated, or a user who updated the data. When the user changes the setting value, the vertical bar graph G25 is updated so as to show the aggregated results based on the changed setting value.

In the at least one embodiment, the user can add up to three classification items. For example, the three classification items have a major-intermediate-minor order, that is, a major item, an intermediate item, and a minor item. In the example of FIG. 3, there is only one classification item, thereby resulting in a state in which only a setting value of the major item is set. When there are, for example, two classification items, the user can set the setting value of the major item and a setting value of the intermediate item. When there are, for example, three classification items, the user can set the setting value of the major item, the setting value of the intermediate item, and a setting value of the minor item.

For example, it is up to the user whether or not to add a classification item. The user may complete setting of the aggregation by setting only one or two classification items. An upper limit number of classification items may be any number, and is not limited to three. For example, the upper limit number of classification items may be two. The number of classification items may be four or more unless the display becomes complicated. When the user selects an add button B23 under the state of FIG. 3, the intermediate item is added.

Figure 4:
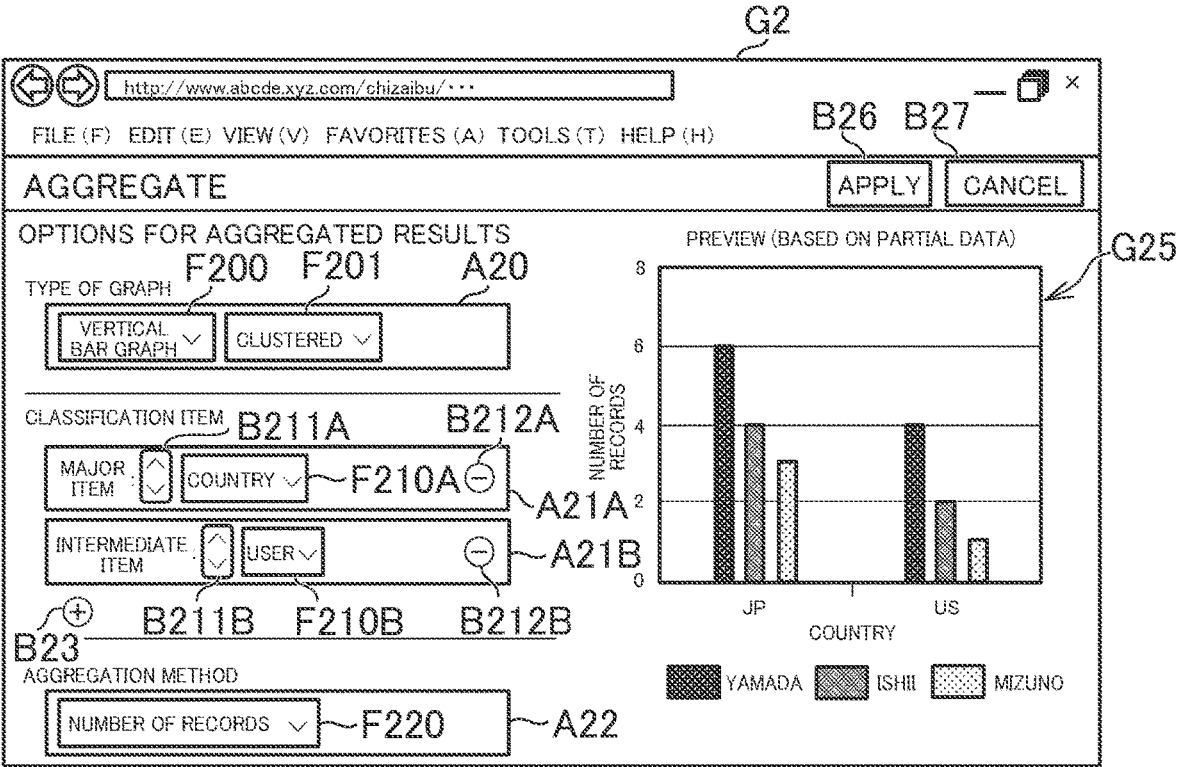
FIG. 4 is a view for illustrating an example of the preview screen displayed when an intermediate item is added.

FIG. 4 is a view for illustrating an example of the preview screen G2 displayed when an intermediate item is added. In the example of FIG. 4, "USER" is set as the setting value of the added intermediate item. The "USER" is not the name of a field but the user who updated the record in some way. On the horizontal axis of the vertical bar graph G25, names corresponding to the setting value of the major item are displayed. Below the vertical bar graph G25, legends corresponding to the setting value of the intermediate item are displayed. In the following, when there are two or more classification items, the classification items are distinguished by suffixing an alphabetical letter to each of reference symbols thereof, such as areas A21A and A21B. In the same manner, individual parts displayed in each area A21 are distinguished by suffixing an alphabetical letter to each of reference symbols thereof as well.

For example, the setting value of the major item remains unchanged as "COUNTRY," but a move button B211A and a delete button B212A are displayed in the area A21A. The move button B211A is an image for performing drag-and-drop, which is described later. The delete button B212A is an image for deleting the setting value of the major item. When there is only one setting value of the classification item as illustrated in FIG. 3, the move button B211A and the delete button B212A are not displayed due to both inability to perform drag-and-drop and inability to delete the setting value.

Parts in the area A21B of the intermediate item are the same as those in the area A21A. When the user selects a delete button B212B, the setting value "USER" of the intermediate item is deleted, and the preview screen G2 returns to the state illustrated in FIG. 3. When the user selects the delete button B212A, the setting value "COUN-TRY" of the major item is deleted. In this case, the setting value "USER" of the intermediate item is moved up in the order to the major item, and hence the vertical bar graph G25 is updated so as to show the aggregated results of the aggregation performed for each user. When the user selects the add button B23 under the state of FIG. 4, a minor item can be added.

Figure 5:
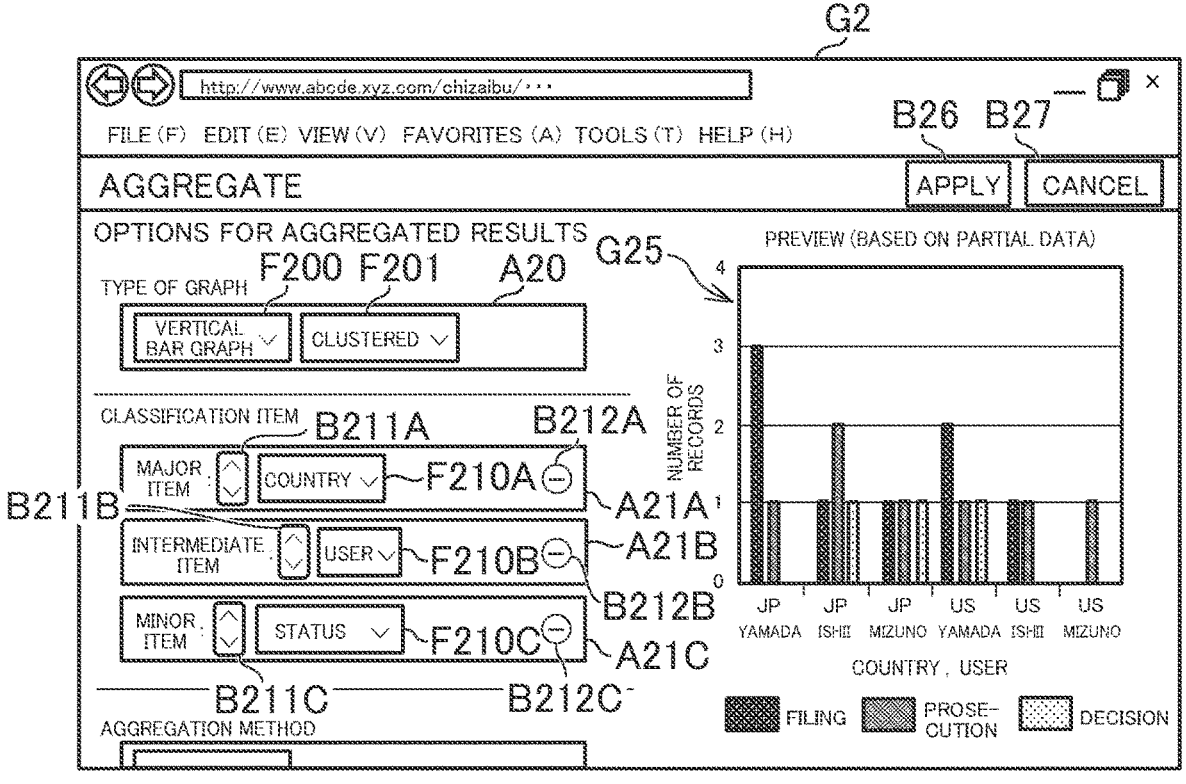
FIG. 5 is a view for illustrating an example of the preview screen displayed when a minor item is added.

FIG. 5 is a view for illustrating an example of the preview screen G2 displayed when the minor item is added. In the example of FIG. 5, "STATUS" is set as the setting value of the added minor item. The "STATUS" is information indicating a current status of an application, and is an example of data hidden in the record list L10. On the horizontal axis of the vertical bar graph G25, names corresponding to the setting value of the major item and the setting value of the intermediate item are displayed. The legends of the vertical bar graph G25 have labels corresponding to the setting value of the minor item. Parts in the area A21C of the minor item are the same as those in the areas A21A and A21B. Under the state illustrated in FIG. 5, no more classification items can be added, and hence the add button B23 is erased.

When the user selects a delete button B212C, the preview screen G2 returns to the state illustrated in FIG. 4. When the user selects the delete button B212A or B212B, the setting value below the selected setting value is moved up in the order. Unless distinguished, the areas A21A to A21C are hereinafter referred to simply as "area A21" by omitting the alphabetical letters suffixed to the reference symbols. In addition, when the parts in the area A21 are not particularly distinguished, the alphabetical letters suffixed to the reference symbols are omitted. When the individual areas A21 and parts are distinguished, the alphabetical letters are suffixed to the reference symbols.

The user repeats the operations described with reference to FIG. 3 to FIG. 5 so as to be able to display the vertical bar graph G25 with an optimum appearance. For example, when the user wishes to try a new setting value instead of the current setting value, the user inputs the new setting value in the input form F210. For example, when the user wishes to try another display method, the user sets another graph and stacked bars or other styles in input forms F200 and F201 in an area A20. When the user wishes to change a setting value of an aggregation method, which is described later, the user inputs a new setting value to an input form F220 in an area A22.

For example, the user may wish to change the major-intermediate-minor order of the setting values of the classification items. In the example of FIG. 5, the user may wish to set the setting value "STATUS" in the intermediate item and set the setting value "USER" in the minor item. In this case, the user can input the setting value "USER" to an input form F210B and input the setting value "STATUS" to an input form F210C, but there occur two operations, which is troublesome. In view of this, in the at least one embodiment, an operation load on the user is alleviated through drag-and-drop of a move button B211.

Figure 6:
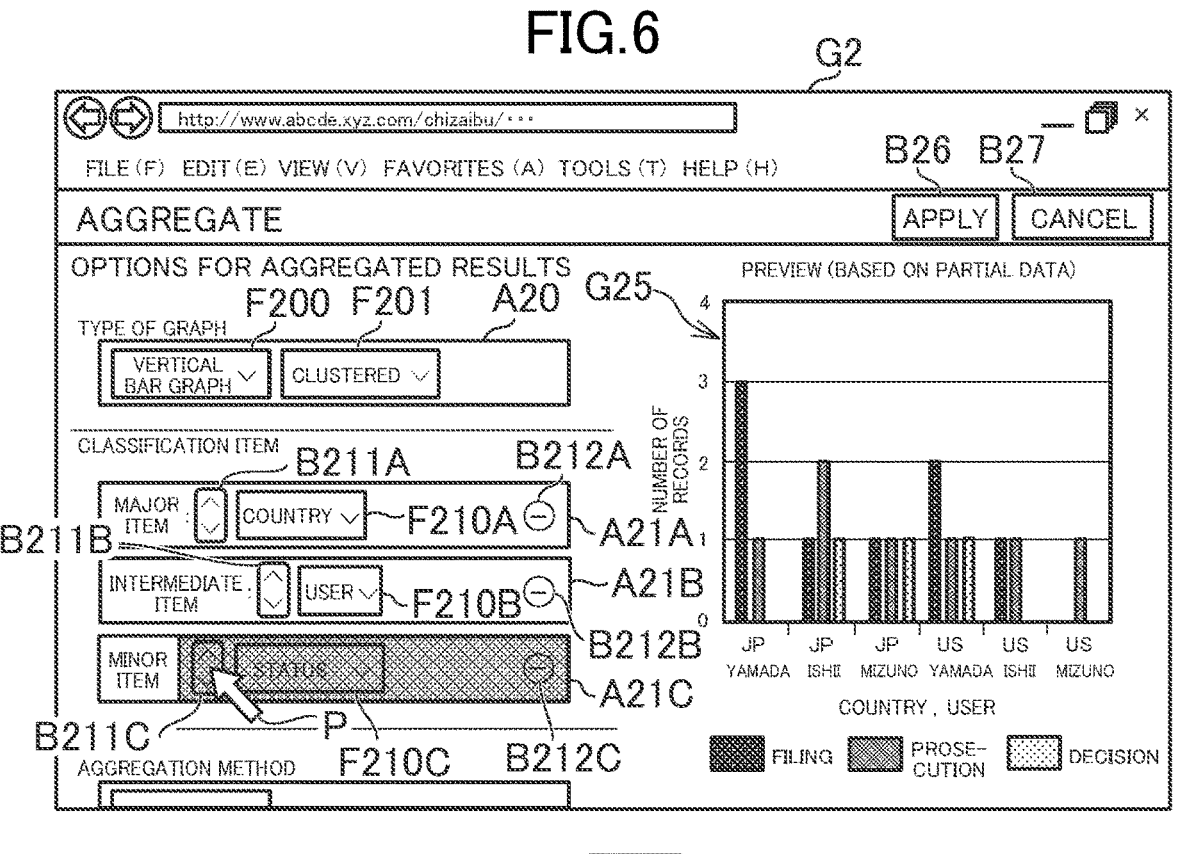
FIG. 6 is a view for illustrating an example of how a user drags and drops a move button.
Figure 6:
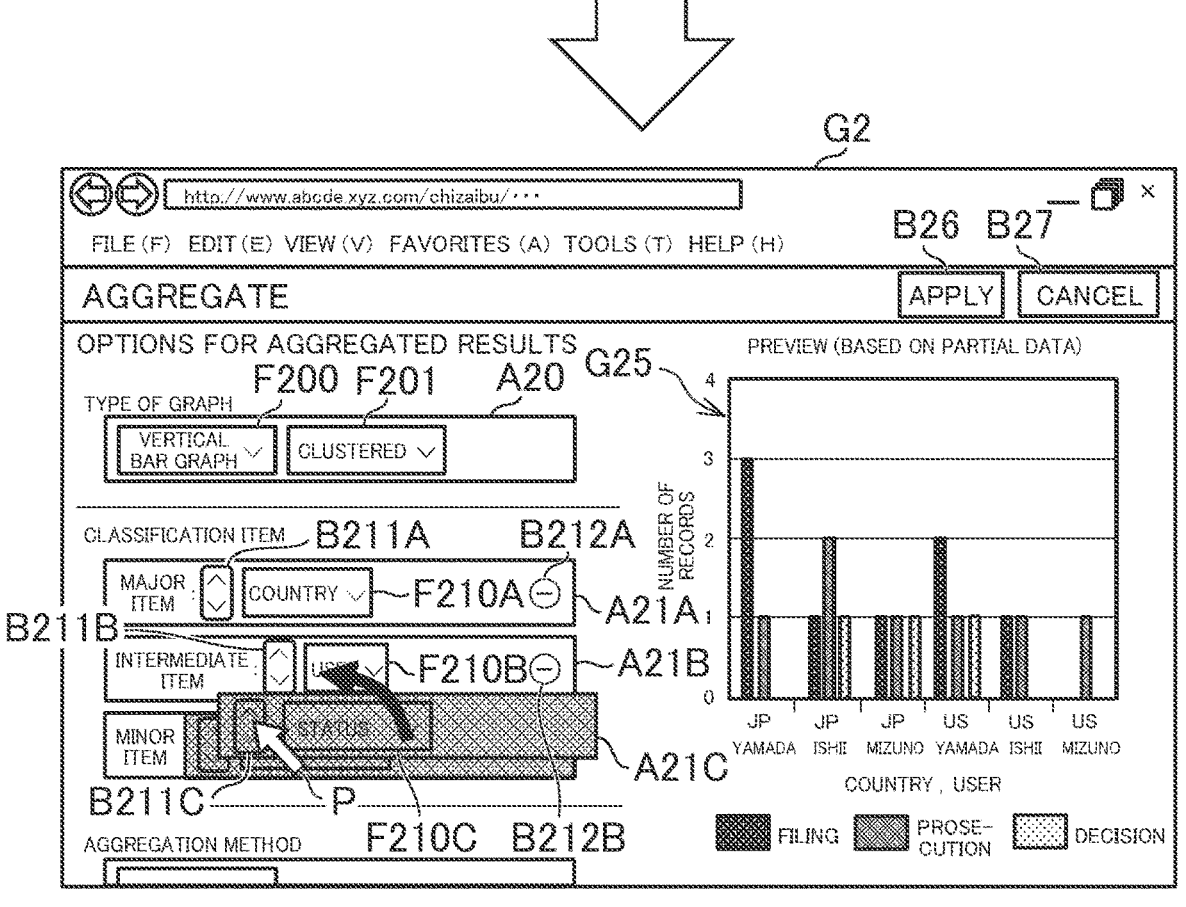

FIG. 6 is a view for illustrating an example of how the user drags and drops the move button B211. In the example of FIG. 6, the user moves a move button B211C onto the area A21B through drag-and-drop. For example, when the user hovers a pointer P (cursor) over the move button B211C, a part of the area A21C corresponding to the setting value an order position of which is to be changed through drag-and-drop is changed in color as illustrated in the preview screen G2 on the upper side of FIG. 6. In the at least one embodiment, a text part of the area A21C indicating "MINOR ITEM" is not moved, but a part to the right of the text part is moved, and hence the color of this part is changed. The user can intuitively grasp which part can be moved due to the change in color.

For example, the user performs an operation for grasping the move button B211C with the pointer P by pressing down a left mouse button of the operating unit 24. In this case, as on the preview screen G2 on the lower side of FIG. 6, the part of the area A21C that has changed in color is copied and moved together with the pointer P during dragging in drag-and-drop. The delete button B212C cannot be operated during the movement, and hence the delete button B212C in the area A21C is erased in order to hide the image that is not required. As illustrated in FIG. 6, when the user drops the move button B211C onto the area A21B, the setting value of the intermediate item and the setting value of the minor item are interchanged with each other.

Figure 7:
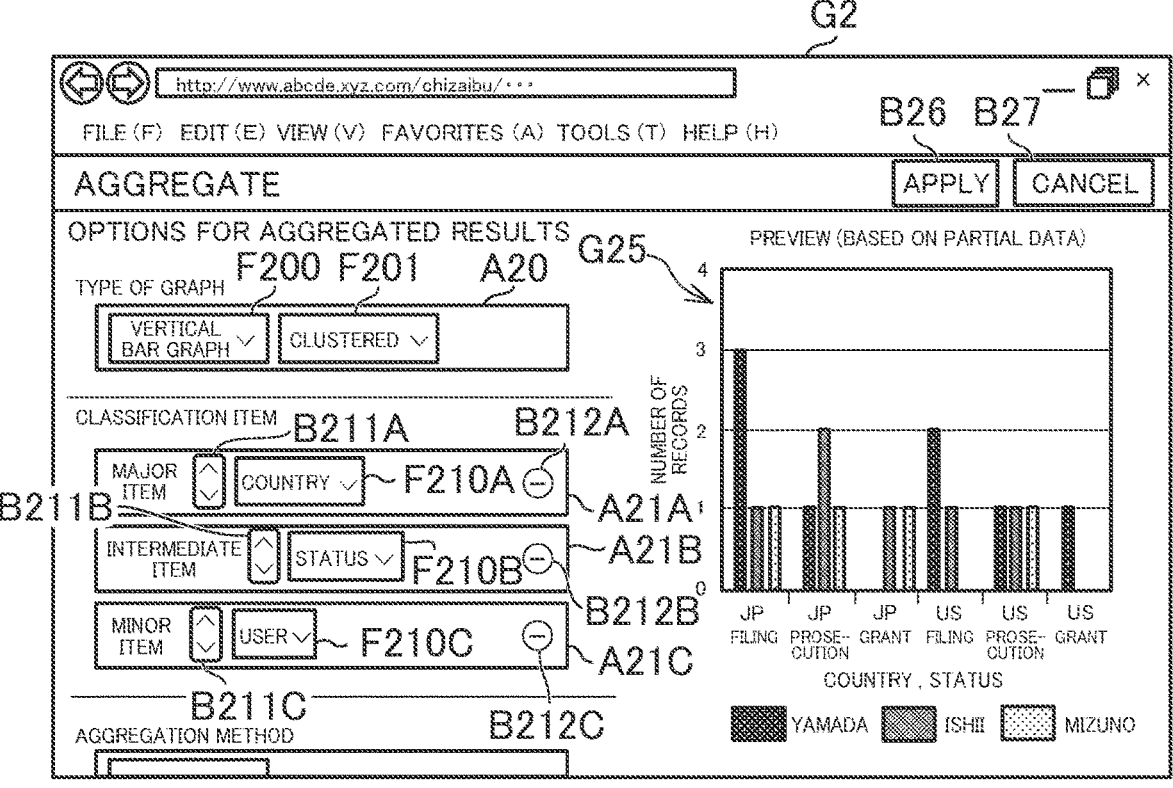
FIG. 7 is a view for illustrating an example of the preview screen displayed when a setting value of the intermediate item and a setting value of the minor item have been interchanged with each other.

FIG. 7 is a view for illustrating an example of the preview screen G2 displayed when the setting value of the intermediate item and the setting value of the minor item are interchanged with each other. As illustrated in FIG. 7, the setting value "STATUS" of the minor item before drag-and-drop becomes the setting value of the intermediate item after drag-and-drop. The setting value "USER" of the intermediate item before drag-and-drop becomes the setting value of the minor item after drag-and-drop. The setting value "COUNTRY" of the major item is not changed.

In the case of FIG. 7, the display of the vertical bar graph G25 is updated so as to show the aggregated results based on the setting value "COUNTRY" of the major item, the setting value "STATUS" of the intermediate item, and the setting value "USER" of the minor item. When the user likes the display of the vertical bar graph G25, the user selects an apply button B26 to apply the setting value. When the setting values are applied, more data is aggregated and the app screen G1 is displayed. When the user selects a cancel button B27, the aggregation of data is ended.

Figure 8:
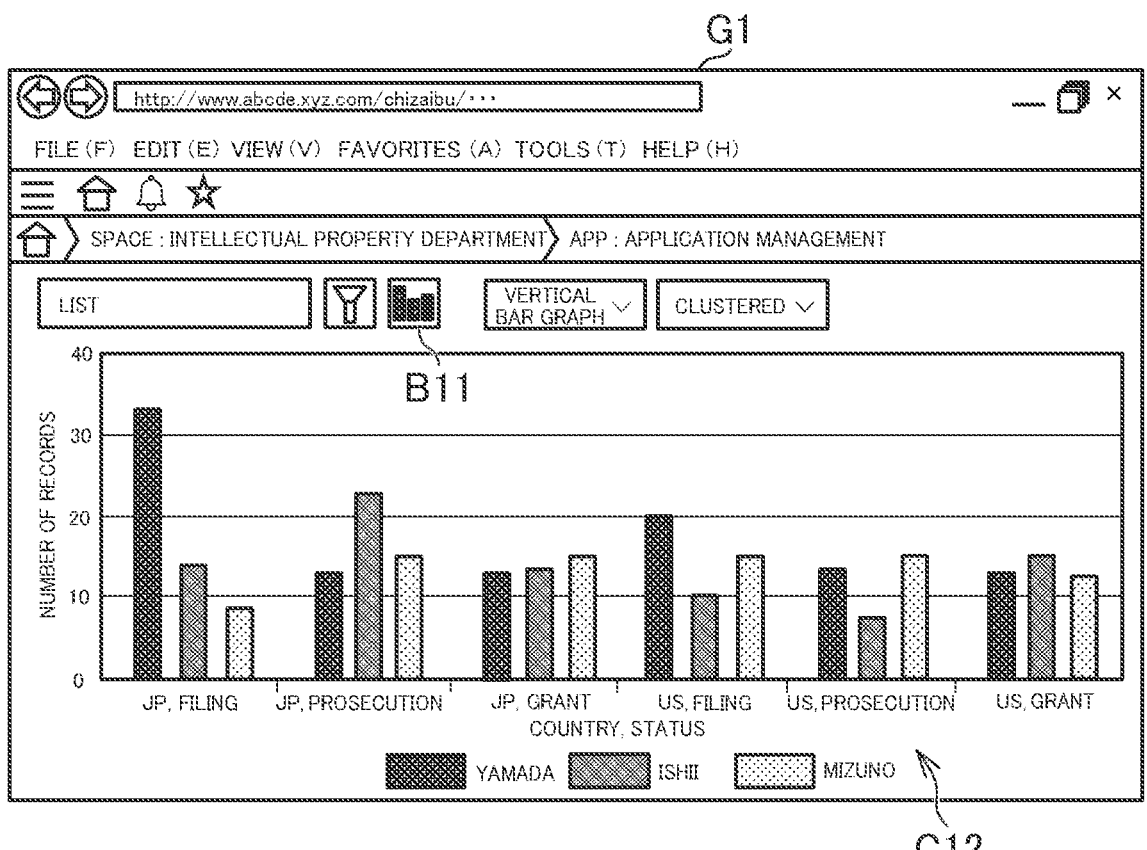
FIG. 8 is a view for illustrating an example of the app screen displayed when the user selects an apply button.

FIG. 8 is a view for illustrating an example of the app screen G1 displayed when the user selects the apply button B26. A vertical bar graph G12 displayed on the app screen G1 is similar in overall layout to the vertical bar graph G25 on the preview screen G2, but more data has been aggregated. The user can also return to the preview screen G2 and reset the setting values. The vertical bar graph G12 on the app screen G1 may be visible only to a user who has logged in, or may be shared with other users.

As described above, in the cloud system 1 according to the at least one embodiment, the order of the setting values of the classification items can be easily changed through the drag-and-drop of the move button B211. Now, details of the cloud system 1 are described.

3. Functions Implemented by Cloud System

Figure 9:
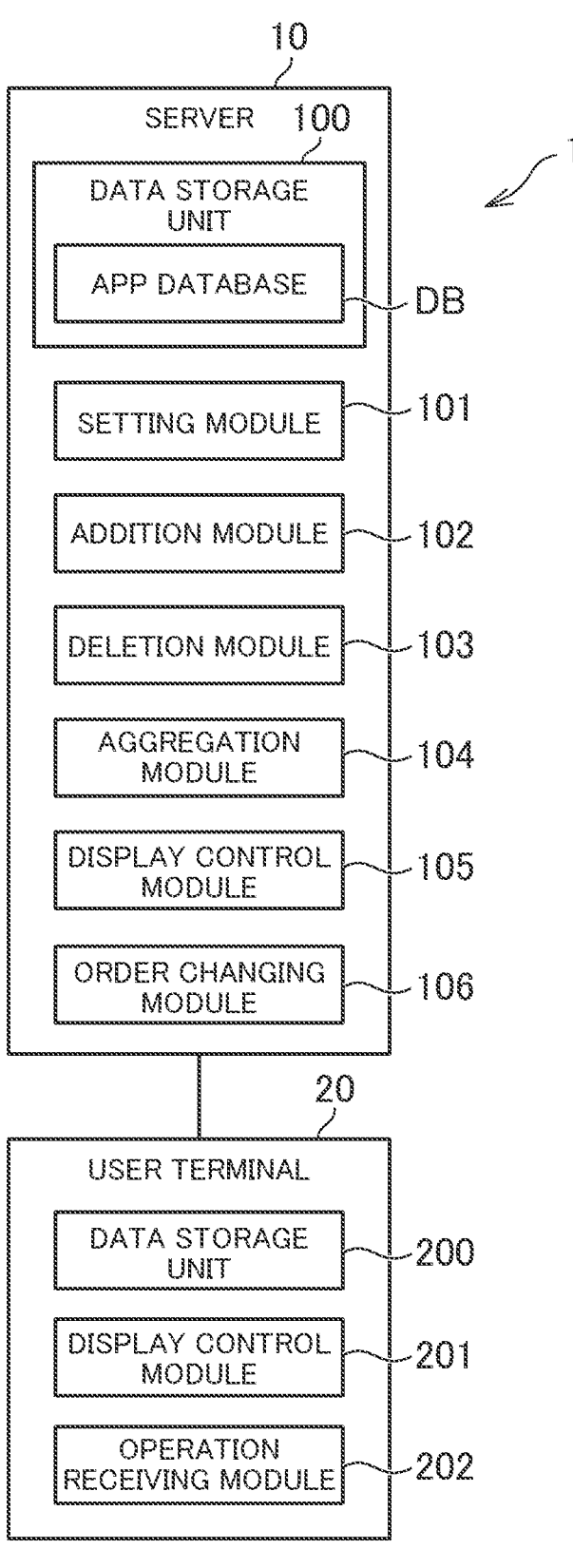
FIG. 9 is a functional block diagram for illustrating functions implemented by the cloud system.

FIG. 9 is a functional block diagram for illustrating functions implemented by the cloud system 1.

[3-1. Functions Implemented by Server]

A data storage unit 100 is implemented by the storage unit 12. A setting module 101, an addition module 102, a deletion module 103, an aggregation module 104, a display control module 105, and an order changing module 106 are implemented by the control unit 11.

[Data Storage Unit]

The data storage unit 100 stores data required for providing a cloud service to a user. In the at least one embodiment, an app database is described as an example of the data.

FIG. 10 is a table for showing a data storage example of an app database DB. The app database DB is a database in which data relating to apps is stored. For example, a name of each app and data registered in the app are stored in the app database DB. The data stored in the app database DB may be any data, and is not limited to the example of FIG. 10. For example, other data including a layout of the record list L10, a creator of the app, or access authority of the app may be stored in the app database DB.

In the at least one embodiment, record data is described as an example of the data registered in the app. The record data is data relating to records. For example, the record data includes data to be displayed in the record list L10 and data to be hidden in the record list L10. For example, the data to be displayed in the record list L10 includes a name of each of a plurality of fields and values of each of the fields. For example, the data to be hidden in the record list L10 is a creation date and time of each record, a name of a user who created the record, an update date/time of the record, or a name of a user who updated the record.

The record data can include any data relating to each record. The data included in the record data is not limited to the example in the at least one embodiment. For example, the record data may include a file registered in the record, a name of a user who uploaded the file, an upload date and time of the file, a comment posted on the record, a name of a user who posted the comment, and a posted date and time of the comment. In such a case of the app relating to application management as in the at least one embodiment, the record data may include a status of an application corresponding to each individual record, a deadline for a procedure with respect to a patent office, a file of a document sent from the patent office, or a file of an invoice relating to each different kind of procedure. Not only data that can be aggregated but also data that cannot be aggregated may be registered in the app.

The data stored in the data storage unit 100 is not limited to the above-mentioned example. The data storage unit 100 may store any data. For example, the data storage unit 100 may store a user database that stores information relating to each user who uses a cloud service. For example, the user database stores data including a user ID that can identify the user, a name of the user, a password, a group (hereinafter referred to sometimes as "space") to which the user belongs, and an affiliation of the user. The data stored in the user database may be aggregated to display aggregated results.

For example, in a case of displaying aggregated results of data other than the data registered in the app, the data storage unit 100 may store the other data. For example, the other data is data relating to each thread. Data relating to the thread includes a thread ID that can identify the thread, a comment posted to the thread, the name of the user who posted the comment, and the posted date and time of the comment. For example, the other data may be data relating to a use status of a cloud service, data relating to a schedule, table-format data that is not called an app, a document file, or further other data. Those pieces of data may be aggregated to display the aggregated results. Data for which the aggregated results are to be displayed is not limited to data shared between users, but may be data provided only to a specific user.

[Setting Module]

The setting module 101 sets a plurality of setting values relating to aggregation based on a predetermined setting operation performed on the preview screen G2. As described above, various setting values can be set on the preview screen G2, but in the at least one embodiment, a case in which the setting value of the classification item is set is taken as an example. Accordingly, an input operation with respect to the input form F210 corresponds to the setting operation. The input operation with respect to the input form F210 as used herein can be read as "setting operation." In a case of the preview screen G2 in the at least one embodiment, input operations with respect to the input forms F200, F201, and F220 also correspond to the setting operations.

The setting operation is an operation for setting a setting value. The setting operation is an operation with respect to the preview screen G2. The setting operation itself may be any kind of operation, and is not limited to the input operation with respect to the pull-down type input form. For example, the setting operation may be an input operation for directly inputting characters or a numerical value to the input form, a selection operation for selecting a radio button, an operation for selecting a checkbox, a click operation, a double-click operation, a drag-and-drop operation, a flick operation, a tap operation, a double-tap operation, a flick operation, or a voice input operation.

The preview screen G2 is an example of the aggregation screen. Accordingly, the preview screen G2 as used herein can be read as "aggregation screen." The aggregation screen is a screen relating to aggregation of data in the cloud service. On the aggregation screen, images (for example, input forms and other parts included in the screen) for performing a setting operation and aggregated results corresponding to the current setting values are displayed. Other images may be displayed on the aggregation screen.

The aggregation screen is not limited to the preview screen G2. When it is not particularly required to display a preview, the aggregation screen may be a screen on which final aggregated results are displayed instead of the aggregated results for a preview. For example, the app screen G1 may correspond to the aggregation screen. The aggregation screen can be displayed on the user terminal 20 of any user. For example, the aggregation screen may be displayed on any one of the user terminal 20 of a user who created the app, the user terminal 20 of an administrator of a group, the user terminal 20 of another user who has management authority, or the user terminal 20 of a user who does not have management authority.

In the at least one embodiment, as an example of the setting value, the setting value of the classification item (setting value input to the input form F210) is described. The setting value itself may be any one of various setting values, and is not limited to the setting value of the classification item. For example, the setting module 101 can set the setting value of the aggregation method (setting value input to the input form F220). The setting value of the aggregation method is a value indicating how to aggregate records. The setting value of the aggregation method assumes a value, such as the number of records, a total sum, an average, a maximum value, or a minimum value. The number of records is the number of records to which a certain value has been input. As the total sum, a total sum of the values input to the records is calculated. As the average, an average of the values input to the records is calculated. As the maximum value, the largest value in a plurality of records is identified. As the minimum value, the smallest value in the plurality of records is identified.

When aggregation is limited to specific records, for example, when a period for aggregation is set, the setting module 101 can set a setting value of a narrowing-down condition. As the setting value of the narrowing-down condition, any condition other than the period can be set. For example, the setting value of the narrowing-down condition may be a keyword or an exclusion keyword. For example, when the aggregated results can be sorted, the setting module 101 may set a setting value of sorting. The setting value of the sorting may be a value of, for example, the major item, the intermediate item, the minor item, an ascending order, or a descending order.

In the at least one embodiment, the setting module 101 can set three or more setting values. When the setting value of the classification item is taken as an example, the setting module 101 can set three setting values including the setting value of the major item, the setting value of the intermediate item, and the setting value of the minor item. The setting module 101 may be able to set four or more setting values. For example, the setting module 101 may be able to set four or more setting values as the setting values of the aggregation method. In addition, for example, the setting module 101 may be able to set four or more setting values as the setting values of the narrowing-down condition.

In the at least one embodiment, the number of setting values of the sorting is up to three, but may be set to four or more as well. The user is not required to set three or more setting values, and it is assumed that an increase or decrease of the number of setting values is freely set by the user. The user may set only one or only two from among the three or more setting values that can be set. The number of setting values may be fixed, but in the at least one embodiment, it is possible to display the aggregated results more flexibly by allowing the user to freely set the number of setting values.

In the at least one embodiment, the setting module 101 can set the setting values respectively corresponding to the plurality of classification items including the major item, the intermediate item, and the minor item. The classification item is an example of a setting item. Accordingly, the setting module 101 sets the setting value of each of a plurality of setting items for classifying and displaying the values to be aggregated by a predetermined aggregation method. The classification item as used in the at least one embodiment can be read as "setting item."

In the at least one embodiment, the major-intermediate-minor classification items, such as the major item, the intermediate item, and the minor item, can be said to serve as an axis in the vertical bar graph G25. As illustrated in FIG. 4 and FIG. 5, the horizontal axis of the vertical bar graph G25 is divided based on the number of values (two of "JP" and "US") that can be assumed by the setting value "COUNTRY" of the major item. The horizontal axis is divided thereamong based on the number of values (three of "YAMADA," "ISHII," and "MIZUNO") that can be assumed by the setting value "USER" of the intermediate item. As illustrated in FIG. 5, the horizontal axis is further divided thereamong based on the number of values (three of "FILING," "PROSECUTION," and "DECISION") that can be assumed by the setting value "STATUS" of the minor item. Accordingly, when the vertical bar graph G25 has an axis, the major-intermediate-minor order of the classification items can be said to serve as an order for dividing an axis.

The setting items are items relating to aggregation. For example, when two or more setting values of the aggregation method are set, an item indicating a position number of each setting value in the order of the setting values of the aggregation method corresponds to the setting item. In addition, for example, when two or more setting values of the narrowing-down condition or the sorting are set, an item indicating a position number of each setting value in the order of the setting values of the narrowing-down condition or the sorting corresponds to the setting item. The setting module 101 can also set the setting values of those other setting items based on the setting operation on the preview screen G2. The setting value may not be set, or a default setting value may be set, for the setting item for which the user has not performed any particular setting operation.

[Addition Module]

The addition module 102 adds a new setting value based on a predetermined addition operation performed on the preview screen G2. In the at least one embodiment, the setting value of the classification item is taken as an example, and hence a selection operation for selecting the add button B23 corresponds to the addition operation. Accordingly, the selection operation for selecting the add button B23 as used herein can be read as "addition operation." The addition operation itself may be any one of various operations and is not limited to the selection operation for selecting the add button B23. An example of another operation may be one that has been exemplified in the setting operation.

For example, when the user adds the setting value of the aggregation method, a selection operation for selecting an add button B24 corresponds to the addition operation. Although not shown in FIG. 3 and other drawings for the sake of convenience, a button for adding the setting value of the narrowing-down condition or the setting value of the sorting is also displayed on the preview screen G2. When the user adds the setting value of the narrowing-down condition or the setting value of the sorting, an operation for selecting each of those buttons corresponds to the addition operation. In a case of enabling another setting value to be set, any operation defined for adding the another setting value may correspond to the addition operation.

In the at least one embodiment, the upper limit number of setting values of classification items is three. Accordingly, the addition module 102 adds a new setting value within a range equal to or smaller than the upper limit number. For example, when the addition button B23 is selected under a state in which only the setting value of the major item is present, the addition module 102 adds the setting value of the intermediate item. When the add button B23 is selected under a state in which the setting value of the major item and the setting value of the intermediate item are present, the addition module 102 adds the setting value of the minor item. In this case, the upper limit number of three has been reached, and hence the addition module 102 does not add any more setting values.

The setting values may be added in order from the minor item. For example, as illustrated in FIG. 3, when there is only one setting value of the classification item, the only one setting value may be the setting value of the minor item in place of the major item. In this case, when the addition button B23 is selected under a state in which only the setting value of the minor item is present, the addition module 102 adds the setting value of the intermediate item. When the add button B23 is selected under a state in which the setting value of the intermediate item and the setting value of the minor item are present, the addition module 102 adds the setting value of the major item. In this case, the upper limit number of three has been reached, and hence the addition module 102 does not add any more setting values.

[Deletion Module]

The deletion module 103 deletes a setting value selected from among the plurality of setting values based on a predetermined deletion operation performed on the preview screen G2. In the at least one embodiment, the setting value of the classification item is taken as an example, and hence a selection operation for selecting a delete button B212 corresponds to the deletion operation. Accordingly, the selection operation for selecting the delete button B212 as used herein can be read as "deletion operation." The deletion operation itself may be any one of various operations, and is not limited to the selection operation for selecting the delete button B212. An example of another operation may be one that has been exemplified in the setting operation.

For example, when the user adds the setting value of the aggregation method, the setting value of the narrowing-down condition, or the setting value of the sorting, the same button as the delete button B212 may be displayed as well. In this case, an operation for selecting each of those buttons corresponds to the deletion operation. In the case of enabling another setting value to be set, any operation defined for deleting the another setting value may correspond to the deletion operation.

In the at least one embodiment, a lower limit number of setting values of classification items is one. Accordingly, the deletion module 103 deletes a setting value within a range equal to or larger than the lower limit value. For example, when the delete button B212 is selected, the deletion module 103 deletes the setting value of the classification item corresponding to the selected delete button B212. When the number of setting values reaches the lower limit number of one, the deletion module 103 does not delete any more setting values. The lower limit number of setting values may be zero. That is, there may be a classification item for which no setting value can be set.

[Aggregation Module]

The aggregation module 104 aggregates the data stored in the app database DB based on the setting value set by the setting module 101. In the at least one embodiment, the setting value of the classification item is taken as an example, and hence the aggregation module 104 aggregates the data for each setting value of the classification item. When the setting value is set for each of the plurality of classification items, the aggregation module 104 aggregates the data for each setting value of each of the plurality of classification items. In the at least one embodiment, the records registered in the app are to be aggregated, and hence the aggregation module 104 aggregates the records for each setting value.

In the example of FIG. 3, only the setting value "COUNTRY" of the major item is set, and hence the aggregation module 104 aggregates the records registered in the app for each value input in the field "COUNTRY." In the example of FIG. 3, one of the two values "JP" and "US" is input in the field "COUNTRY." Accordingly, the aggregation module 104 aggregates the number of records having "JP" input in the field "COUNTRY" and the number of records having "US" input in the field "COUNTRY."

In the example of FIG. 4, the setting value "COUNTRY" of the major item and the setting value "USER" of the intermediate item are set, and hence the aggregation module 104 aggregates the records registered in the app for each combination of those two. In the example of FIG. 4, the field "COUNTRY" assumes the two values "JP" and "US." The user relating to the records has three values "YAMADA," "ISHII," and "MIZUNO." There are six ($=2\times3$) patterns in the combinations of those. Accordingly, the aggregation module 104 aggregates the numbers of records in the six patterns.

In the example of FIG. 5, the setting value "COUNTRY" of the major item, the setting value "USER" of the intermediate item, and the minor item "STATUS" are set, and hence the aggregation module 104 aggregates the records registered in the app for each combination of those three. In the example of FIG. 5, the field "COUNTRY" assumes the two values "JP" and "US." The user relating to the records has three values "YAMADA," "ISHII," and "MIZUNO." The status has three values "FILING," "PROSECUTION," and "DECISION." There are 18 ($2\times3\times3$) patterns in the combinations of those. Accordingly, the aggregation module 104 aggregates the numbers of records in the 18 patterns.

The aggregation module 104 can aggregate the records based on the setting value of another setting item other than the classification item. For example, the aggregation module 104 aggregates the records based on the setting value of the aggregation method. For example, the aggregation module 104 aggregates the records based on the setting value of the narrowing-down condition. In regard to the sorting, the aggregated number of records itself does not change, but the aggregation module 104 may again aggregate the records when the setting value of the sorting is set. Even when the setting value is changed, the aggregation module 104 is not required to again execute the aggregation as long as the change does not require the aggregation to be executed again.

[Display Control Module]

The display control module 105 displays various screens relating to a cloud service on the user terminal 20. In the at least one embodiment, the display control module 105 is implemented by the server 10. For that reason, the display control module 105 transmits display data for displaying a certain screen to the user terminal 20, to thereby display the certain screen on the user terminal 20. The display data may have any data format. For example, when a browser is used, the display data may be HTML data, or may be image data or text data that forms a part of the screen. For example, when an application dedicated to the cloud service is used in place of the browser, the display data may be data having a data format conforming to this application.

In the at least one embodiment, processing for displaying the preview screen G2 is mainly described. As described above, various setting values can be set on the preview screen G2, but in the at least one embodiment, processing for displaying the vertical bar graph G25 corresponding to the setting value of the classification item is described. When the vertical bar graph G25 is to be updated, the display control module 105 may transmit only display data of the vertical bar graph G25 to the user terminal 20, or may transmit display data of the entire preview screen G2 to the user terminal 20.

The vertical bar graph G25 is an example of the aggregated results. Accordingly, the vertical bar graph G25 as used herein can be read as "aggregated results." The aggregated results form an image that shows execution results of aggregation executed by the cloud service. The aggregated results may form any image, which is not limited to the vertical bar graph G25. For example, the above-mentioned horizontal bar graph or another graph may correspond to the aggregated results, or a table may correspond to the aggregated results. For example, the aggregated results may be displayed through use of text, a gauge, or another method in place of a graphical or tabular format.

In the example of FIG. 3, only the setting value "COUNTRY" of the major item is set, and hence the display control module 105 displays the vertical bar graph G25 corresponding to the field "COUNTRY" on the preview screen G2. When a plurality of setting values are set as illustrated in FIG. 4 and FIG. 5, the display control module 105 displays the vertical bar graph G25 corresponding to the plurality of setting values and the major-intermediate-minor order of the plurality of setting values on the preview screen G2.

The major-intermediate-minor order of the three classification items of the major item, the intermediate item, and the minor item is an example of an order relating to the plurality of setting values. Accordingly, the major-intermediate-minor order as used herein can be read as "order relating to the plurality of setting values." This order may be any order set for the plurality of setting values in accordance with some standard. For example, the aggregation method does not have such an order as the major-intermediate-minor order, and hence a display order of the plurality of setting values on the preview screen G2 may correspond to the order relating to the plurality of setting values. That is, information indicating position numbers of the setting values in the order, for example, indicating that the first setting value of the aggregation method and the second setting value of the aggregation method, may correspond to the order.

For example, the user can set the second setting value of the aggregation method by selecting the add button B24. When the user sets "TOTAL SUM" as the second setting value, the display of the vertical bar graph G25 is updated so that the aggregated results of "TOTAL SUM" are displayed. Then, the user can set the third setting value of the aggregation method by selecting the add button B24. When the user sets "AVERAGE" as the third setting value, the display of the vertical bar graph G25 is updated so that the aggregated results of the average are displayed.

When the user deletes the setting value of the aggregation method, the display of the vertical bar graph G25 may be updated based on the setting value remaining without being deleted. In the same manner, when the setting value of the narrowing-down condition or the sorting is added, the display control module 105 may update the display of the vertical bar graph G25 based on the added setting value. In the same manner, when the setting value of the narrowing-down condition or the sorting is deleted, the display control module 105 may update the display of the vertical bar graph G25 based on the setting value remaining without being deleted. It is assumed that the setting value remaining without being deleted is moved up in the order as the requirement arises.

As described above, the display control module 105 can display the vertical bar graph G25 on the preview screen G2 based on the setting value other than the setting value of the classification item. Referring back to the description of the setting value of the classification item, when the major-intermediate-minor order of the plurality of setting values is changed by the order changing module 106, which is described later, the display control module 105 updates the preview screen G2 so that the vertical bar graph G25 corresponding to the changed order is displayed. For example, the aggregation module 104 again aggregates the records based on the changed major-intermediate-minor order, and hence the display control module 105 updates the vertical bar graph G25 so that the vertical bar graph G25 shows the results of the aggregation executed again. The combination of the three setting values does not change, and only the major-intermediate-minor order thereof is different. Thus, processing itself in the aggregation executed again is the same as the aggregation executed first.

In the at least one embodiment, the preview screen G2 for displaying the provisional aggregated results corresponding to the plurality of setting values and the major-intermediate-minor order is an example of the aggregation screen, and hence the display control module 105 displays the provisional aggregated results on the preview screen G2. In the at least one embodiment, the provisional aggregated results are results of the aggregation executed before the app screen G1 displayed after the apply button B26 is selected on the preview screen G2. The provisional aggregated results are aggregated results obtained before the setting values are determined. The aggregation processing itself may be the same for the provisional aggregated results and for the aggregated results to be obtained after the setting values are determined.

For example, the display control module 105 may display provisional aggregated results using only a part of all aggregatable pieces of data on the preview screen G2. Assuming that the number of records registered in the app is 1,000, the aggregation module 104 may aggregate about 100 thereof. In this case, the display control module 105 displays, on the preview screen G2, the vertical bar graph G25 that shows the aggregated results regarding the about 100 records. The pieces of data to be aggregated may be randomly selected or may be selected in the order of records. The number of pieces of data to be aggregated may be a fixed number or may be dynamically determined with, for example, a predetermined ratio to the total number of records.

In the at least one embodiment, when the pointer P overlaps with the move button B211, the display control module 105 changes a display mode of an area (in FIG. 6, a part of the area A21C) of the preview screen G2 corresponding to the setting value the order position of which is to be changed by a change operation. The move button B211 is an example of a move image. Accordingly, the move button B211 as used herein can be read as "move image." The move image may be any image that can be moved on the screen, and is not limited to a button. For example, the move image may be an icon, an input form, a radio button, or a checkbox.

The area corresponding to the setting value refers to an area of the preview screen G2 including the position at which the setting value is displayed. In the example of FIG. 6, an area (area having a color changed in the area A21C of FIG. 6) including the input form F210C in which the setting value of the "MINOR ITEM" the order position of which is to be changed by the change operation is displayed corresponds to the area corresponding to the setting value. The display mode refers to an appearance as an image. For example, color, brightness, transparency, pattern, shape, size, or some effect is an example of the display mode. In the example of FIG. 6, when the pointer P overlaps with the move button B211C, the display control module 105 changes the color of a part of the area A21C corresponding to the setting value the order position of which is to be changed by the change operation, to thereby change the display mode. The display mode may be changed not when the pointer P overlaps with the move button B211C but when the move button B211C is clicked after that.

For example, when the display control module 105 cannot reflect a predetermined operation with respect to the preview screen G2, the display control module 105 may control the display of the preview screen G2 so that an operation image corresponding to the predetermined operation is not displayed. The predetermined operation is an operation that can be performed depending on the state of the preview screen G2. The operation image is an image for receiving a predetermined operation. For example, the add buttons B23 and B24, the move button B211, and the delete button B212 are examples of the operation images. Accordingly, those buttons as used herein can be read as "operation image." An operation with respect to each of those buttons is an example of the predetermined operation. Accordingly, the addition operation, the deletion operation, and the change operation are examples of the predetermined operations.

In the at least one embodiment, the display control module 105 controls, based on the dragging operation in the drag-and-drop, the display of the preview screen G2 so that the selected setting value is moved without moving the position of each of the plurality of classification items. In the example of FIG. 6, the display control module 105 moves only the part to the right of the text part indicating "MINOR ITEM" without moving the text part indicating "MINOR ITEM" even when the drag-and-drop is performed. In the same manner, when each of the order positions of the setting value of the major item and the setting value of the intermediate item is changed, a text part indicating "MAJOR ITEM" or "INTERMEDIATE ITEM" is not moved. The position of the classification item may be any position assigned to the classification item on the preview screen G2. For example, when a help icon is used for supplementation without displaying the text indicating the name, such as "MAJOR ITEM," "INTERMEDIATE ITEM," or "MINOR ITEM," a position of the help icon may correspond to the position of the classification item. In addition, for example, when the text or the icon is not particularly displayed, a position at which nothing is displayed may correspond to the position of the classification item.

[Order Changing Module]

The order changing module 106 changes the major-intermediate-minor order based on a predetermined change operation performed on the preview screen G2. Changing the order can also be said to interchanging or rearranging the setting values.

When there are correspondences between the classification items and the setting values as in the at least one embodiment, it can be said that shuffling those correspondences corresponds to changing the order. That is, changing the combinations of the classification items and the setting values corresponds to changing the order.

In the at least one embodiment, the drag-and-drop of the move button B211 corresponds to the change operation. Accordingly, the drag-and-drop of the move button B211 as used herein can be read as "change operation." The change operation is an operation defined for changing the order. For example, the change operation may be an operation for moving the setting value selected from among the plurality of setting values on the preview screen G2. For example, the change operation may be an operation with respect to a button for interchanging the setting values, an operation for performing keyboard input with, for example, up/down buttons after focusing on the input form F210, a flick operation, or a swipe operation. In addition, for example, the change operation may be an operation with respect to the vertical bar graph G25.

In the at least one embodiment, the change operation is drag-and-drop from a first area corresponding to any one of the plurality of setting values to a second area corresponding to another one of the setting values on the preview screen G2. The first area is an area including the position at which the drag-and-drop is started. In the example of FIG. 6, an area of the move button B211C or a vicinity thereof corresponds to the first area. The second area is an area including a position (drop position) at which the drag-and-drop is ended. In the example of FIG. 6, a partial area of the area A21B corresponds to the second area.

For example, the change operation may be an operation for changing the order position of the setting value selected from among three or more setting values. The move button B211 for moving the order position of the setting value is displayed on the preview screen G2 for each setting value, and hence the change operation is an operation for moving the move button B211 corresponding to any one of the plurality of setting values. The order position is an order position relating to the setting value corresponding to the position of each of the plurality of setting items. The change operation is an operation for changing the setting item corresponding to the setting value selected from among the plurality of setting values.

Figure 11:
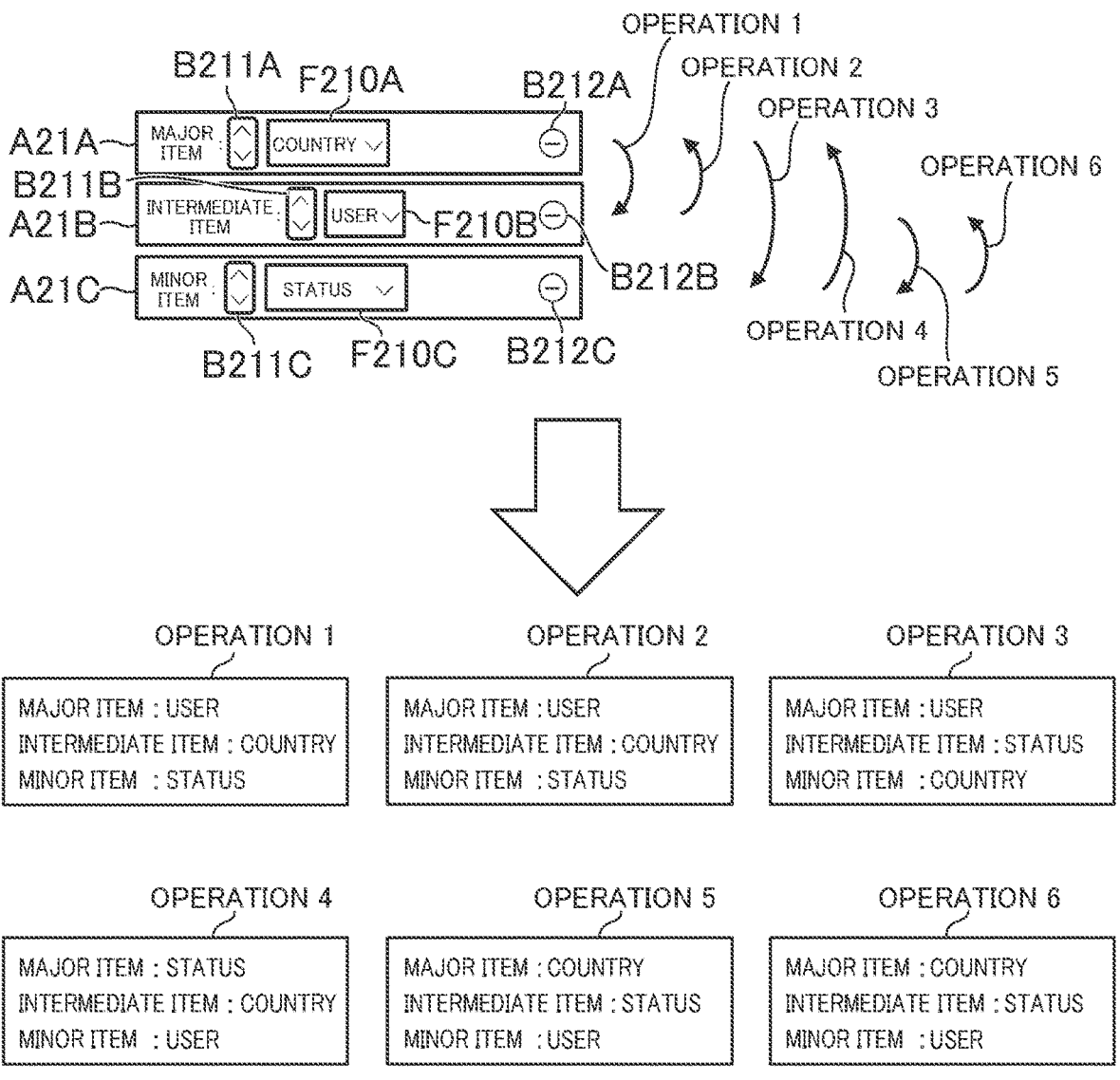
FIG. 11 is a diagram for illustrating an example of how order positions of a setting value of a major item, the setting value of the intermediate item, and the setting value of the minor item are changed.

FIG. 11 is a diagram for illustrating an example of how the order positions of the setting value of the major item, the setting value of the intermediate item, and the setting value of the minor item are changed. In the at least one embodiment, the order changing module 106 changes the order so that the order position of the selected setting value is changed and a relative order between the other setting values is maintained. The selected setting value is the setting value selected at the start of drag-and-drop. In the example of FIG. 6, the setting value "STATUS" of the minor item corresponds to the selected setting value. The other setting values are the setting values that have not been selected. In the example of FIG. 6, the setting value "COUNTRY" of the major item and the setting value "USER" of the intermediate item correspond to the other setting values. The relative order is an anteroposterior relationship between the other setting values in terms of the order.

In the example of FIG. 11, there are shown cases in which (Operation 1) drag-and-drop from the major item to the intermediate item, (Operation 2) drag-and-drop from the intermediate item to the major item, (Operation 3) drag-and-drop from the major item to the minor item, (Operation 4) drag-and-drop from the minor item to the major item, (Operation 5) drag-and-drop from the intermediate item to the minor item, and (Operation 6) drag-and-drop from the minor item to the intermediate item have each been performed from the state of FIG. 5.

For example, when Operation 1 or Operation 2 is performed, the order changing module 106 interchanges the order positions of the setting value "COUNTRY" of the major item and the setting value "USER" of the intermediate item with each other to set the setting value of the major item as "USER" and the setting value of the intermediate item as "COUNTRY." In this case, the order position of the setting value "STATUS" of the minor item is not changed.

For example, when Operation 3 is performed, the order changing module 106 changes the order position of the setting value "COUNTRY" so that the setting value "COUNTRY" of the major item becomes the setting value of the minor item. The order changing module 106 moves up the order positions of the setting value "USER" of the intermediate item and the setting value "STATUS" of the minor item. When the order positions are moved up, the relative order between the setting value "USER" and the setting value "STATUS" is maintained. Thus, the setting value "USER" becomes the setting value of the major item, and the setting value "STATUS" becomes the setting value of the intermediate item.

For example, when Operation 4 is performed, the order changing module 106 changes the order position of the setting value "STATUS" so that the setting value "STATUS" of the minor item becomes the setting value of the major item. The order changing module 106 moves down the order positions of the setting value "COUNTRY" of the major item and the setting value "USER" of the intermediate item. When the order positions are moved down, the relative order between the setting value "COUNTRY" and the setting value "USER" is maintained. Thus, the setting value "COUNTRY" becomes the setting value of the intermediate item, and the setting value "USER" becomes the setting value of the minor item.

For example, when Operation 5 or Operation 6 is performed, the order changing module 106 interchanges the order positions of the setting value "USER" of the intermediate item and the setting value "STATUS" of the minor item with each other to set the setting value of the intermediate item as "STATUS" and the setting value of the minor item as "USER." In this case, the order position of the setting value "COUNTRY" of the major item is not changed.

When the drag-and-drop is performed, it is not required to push the selected setting value into the order as illustrated in FIG. 11. For example, the order changing module 106 may only interchange the setting value at a start point and the setting value at an end point in the drag-and-drop with each other. In this case, the order position of the setting value that has been neither at the start point nor at the end point in the drag-and-drop is not changed.

3-2. Functions Implemented by User Terminal

A data storage unit 200 is implemented by the storage unit 22. A display control module 201 and an operation receiving module 202 are implemented by the control unit 11.

[Data Storage Unit]

The data storage unit 200 stores data required for providing a cloud service to the user. For example, the data storage unit 200 stores a browser for displaying various screens relating to the cloud service. For example, the data storage unit 200 stores an application of the cloud service. For example, the data storage unit 200 stores the setting values being set and the order positions thereof. The setting values and the order positions are transmitted to the server 10 as appropriate.

[Display Control Module]

The display control module 201 displays various screens relating to the cloud service on the display unit 25. For example, the display control module 201 displays, on the display unit 25, the app screen G1 or the preview screen G2 based on the display data received from the server 10.

[Operation Receiving Module]

The operation receiving module 202 receives various operations in the cloud service. For example, the operation receiving module 202 receives the above-mentioned setting operation, change operation, addition operation, deletion operation, or another operation. Details of those operations are transmitted to the server 10 as appropriate.

4. Processing Executed by Cloud System

Figure 12:
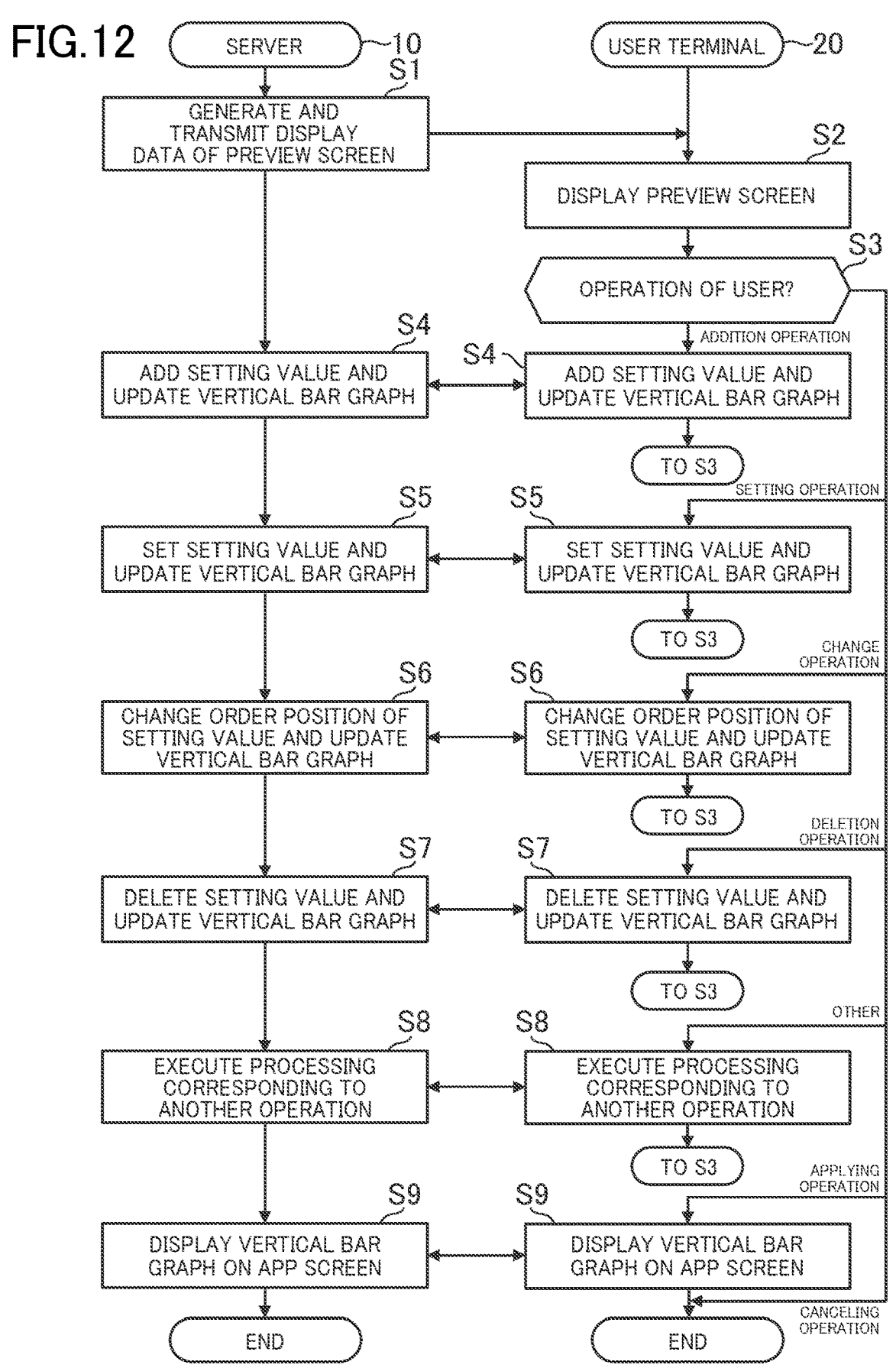
FIG. 12 is a flow chart for illustrating an example of processing to be executed by the cloud system.

FIG. 12 is a flow chart for illustrating an example of processing to be executed by the cloud system 1. It is assumed that the user has already logged in to the cloud service when the processing of FIG. 12 is executed. With reference to FIG. 12, the processing to be executed when the graph button B11 on the app screen G1 is selected is described.

As illustrated in FIG. 12, when the graph button B11 on the app screen G1 is selected, the server 10 aggregates data based on the default setting value to generate display data of the preview screen G2, and transmits the display data to the user terminal 20 (Step S1). When the user terminal 20 receives the display data, the user terminal 20 displays the preview screen G2 on the display unit 25 (Step S2). In Step S2, the preview screen G2 in the state of FIG. 3 is displayed.

The user terminal 20 identifies an operation of the user based on a detection signal from the operating unit 24 (Step S3). In this step, it is assumed that an addition operation for selecting the add button B23, an operation for setting the setting value with respect to the input form F210, a change operation for moving the move button B211, a deletion operation for selecting the delete button B212, an applying operation for selecting the apply button B26, a canceling operation for selecting the cancel button B27, or another operation is performed.

When the addition operation is performed in Step S3 ("ADDITION OPERATION" in Step S3), the server 10 and the user terminal 20 execute processing for adding the setting value of the classification item and updating the vertical bar graph G25 (Step S4), and the process returns to the processing step of Step S3. In Step S4, the default setting value is set for the added classification item, and the aggregation is executed. The preview screen G2 in the state of FIG. 4 or FIG. 5 is displayed.

When the setting operation is performed in Step S3 ("SETTING OPERATION" in Step S3), the server 10 and the user terminal 20 execute processing for setting the setting value and updating the vertical bar graph G25 (Step S5), and the process returns to the processing step of Step S3. In Step S5, the aggregation based on the setting value set by the user is executed, and the vertical bar graph G25 is updated.

When the change operation is performed in Step S3 ("CHANGE OPERATION" in Step S3), the server 10 and the user terminal 20 execute processing for changing the order position of the setting value and updating the vertical bar graph G25 (Step S6), and the process returns to the processing step of Step S3. In Step S6, processing of the flow described with reference to FIG. 6 and FIG. 7 is executed.

When the deletion operation is performed in Step S3 ("DELETION OPERATION" in Step S3), the server 10 and the user terminal 20 execute processing for deleting the setting value of the classification item and updating the vertical bar graph G25 (Step S7), and the process returns to the processing step of Step S3. In Step S7, the aggregation is executed based on the setting value remaining without being deleted, and the vertical bar graph G25 is updated.

When another operation is performed in Step S3 ("OTHER" in Step S3), the server 10 and the user terminal 20 execute processing corresponding to the another operation that has been performed (Step S8), and the process returns to the processing step of Step S3. When the applying operation is performed in Step S3 ("APPLYING OPERATION" in Step S3), the server 10 and the user terminal 20 execute processing for displaying the vertical bar graph G12 on the app screen G1 (Step S9), and this process is ended. When the canceling operation is performed ("CANCELING OPERATION" in Step S3), this process is ended.

The cloud system 1 according to the at least one embodiment changes the major-intermediate-minor order of the plurality of setting values based on the drag-and-drop of the move button B211 performed on the preview screen G2. When the major-intermediate-minor order is changed, the cloud system 1 updates the preview screen G2 so that the vertical bar graph G25 corresponding to the changed order is displayed. This can alleviate an operation load on the user when the order of the setting values is changed. For example, as illustrated in FIG. 6, in the case of interchanging the setting value of the minor item and the setting value of the intermediate item, those setting values can be interchanged by such a simple operation as drag-and-drop instead of two operations for inputting one of the setting values to the input form F210B again and also inputting the other setting value to the input form F210C again.

Further, the cloud system 1 displays the vertical bar graph G25 serving as the provisional aggregated results on the preview screen G2. This can alleviate an operation load on the user when the setting value is determined on the preview screen G2 before the vertical bar graph G12 is actually displayed on the app screen G1. The user is allowed to try the setting value on the preview screen G2 before the app screen G1 is displayed, and hence the convenience of the user is enhanced.

Further, the cloud system 1 displays the provisional aggregated results using only a part of all aggregatable pieces of data on the preview screen G2. Thus, it is not required to aggregate all the pieces of data in order for the user to check the rough appearance of the vertical bar graph G25, and hence it is possible to alleviate a processing load on the server 10. From the viewpoint of the user, a time period required for displaying the vertical bar graph G25 on the preview screen G2 is shortened, and hence the convenience of the user is enhanced.

Further, the cloud system 1 adds a new setting value when the add button B23 is selected on the preview screen G2. When the delete button B212 is selected on the preview screen G2, the setting value selected from among the plurality of setting values is deleted. Thus, the number of setting values can be freely increased or decreased in addition to the use of the default setting value, and hence the convenience of the user is enhanced.

Further, for example, when three setting values, that is, the major item, the intermediate item, and the minor item, are set, the cloud system 1 changes the order so that the order position of the selected setting value is changed and the relative order between the order positions of the other setting values is maintained. Thus, it becomes easier for the user to intuitively understand the change in the order of the setting values.

Further, in the cloud system 1, the order position of the setting value is changed through the drag-and-drop of the move button B211 displayed on the preview screen G2. Thus, the order position of the setting value can be changed by a simple and intuitive operation, and hence the convenience of the user is enhanced while alleviating a load on the user.

Further, when the pointer P overlaps with the move button B211, the cloud system 1 changes the display mode of a part of the area A21 on the preview screen G2 corresponding to the setting value the order position of which is to be changed by the change operation. Thus, the user can easily grasp which setting value can be changed in the order position, and hence the convenience of the user is enhanced.

Further, when the cloud system 1 cannot reflect a predetermined operation with respect to the preview screen G2, the cloud system 1 controls the display of the preview screen G2 so that the operation image corresponding to the predetermined operation is not displayed. This can prevent the user from being confused at the operation image of a certain operation displayed even when the certain operation cannot be reflected. Unnecessary operation images are not displayed on the preview screen G2, and hence design is improved.

Further, the cloud system 1 controls the display of the preview screen G2 so that the selected setting value is moved based on the drag-and-drop with respect to the move button B211 without moving the name of the classification item, that is, the major item, the intermediate item, or the minor item. Thus, the order positions of the text parts indicating the major item, the intermediate item, and the minor item are not interchanged, to thereby result in the preview screen G2 that facilitates the understanding of a relationship between those order positions. Further, the order position to be changed by the change operation is the order position relating to the setting value corresponding to the position of each of the plurality of classification items. Thus, when the aggregated results are to be changed depending on the setting value corresponding to the position of the classification item, it is possible to change the order position by a simple change operation.

Further, the change operation is the drag-and-drop from the first area corresponding to any one of the plurality of setting values to the second area corresponding to another one of the setting values on the preview screen G2. Thus, it is possible to change the order position of the setting value by a more intuitive operation.

5. Modification Example

The present disclosure is not limited to the example of the at least one embodiment described above, and can be modified suitably without departing from the spirit of the present disclosure.

For example, in the at least one embodiment, a case in which the vertical bar graph G25 on the preview screen G2 is updated after the drop in the drag-and-drop is performed has been described. The vertical bar graph G25 may be updated before the drop in the drag-and-drop is performed. In a modification example of the present disclosure, the order changing module 106 provisionally changes the order when the second area is specified on the preview screen G2 before the drop in the second area is performed. The provisional change is to change the order itself but to cancel the change in the order depending on the drop position of the drag-and-drop. For example, when the drop is performed in an area other than the area A21, the provisional change is canceled to restore the order exhibited before the drag-and-drop is performed. Accordingly, in the modification example, it is assumed that the order exhibited at the start of the drag-and-drop is maintained. The provisional change is executed when the pointer P overlaps with the area corresponding to another setting value during the drag-and-drop of the move button B211 of a certain setting value.

Figure 13:
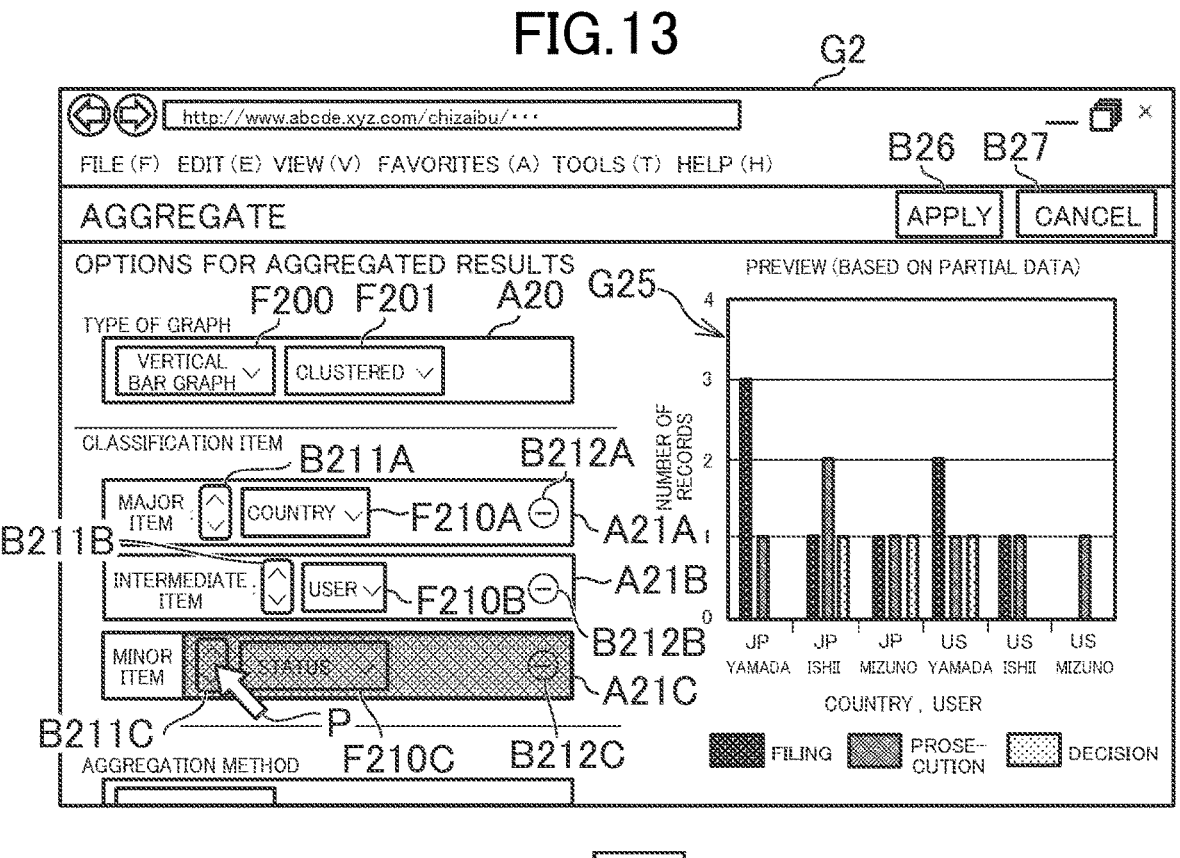
FIG. 13 is a view for illustrating an example of how a vertical bar graph is updated in a modification example of the present disclosure.
Figure 13:
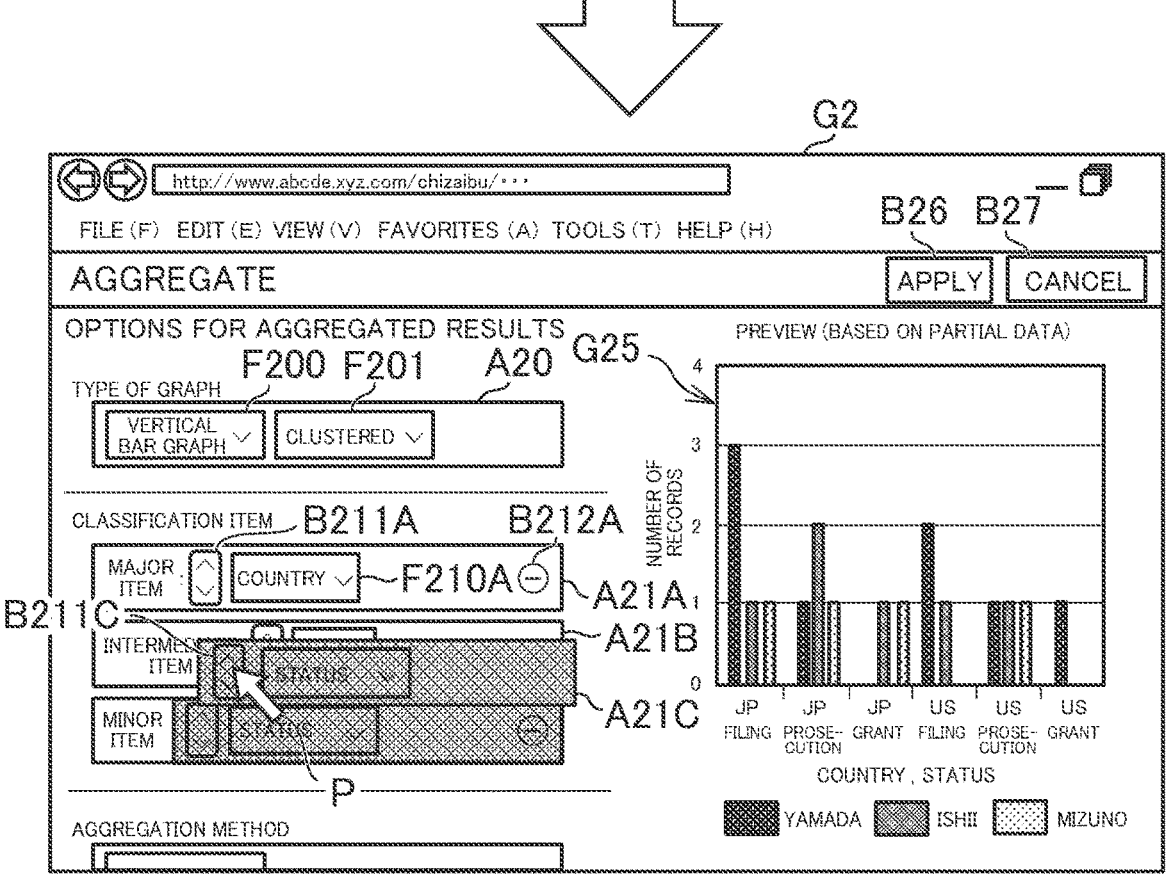

FIG. 13 is a view for illustrating an example of how the vertical bar graph G25 is updated in the modification example. The display control module 105 updates the preview screen G2 so that the vertical bar graph G25 corresponding to the provisionally changed order is displayed. The modification example differs from the at least one embodiment in that the provisionally changed order is used, but an update method itself for the vertical bar graph G25 on the preview screen G2 is the same as that in the at least one embodiment. When the provisional change is canceled, the display control module 105 returns the vertical bar graph G25 on the preview screen G2 to a state exhibited before the start of the drag-and-drop.

According to the above-mentioned modification example, the preview screen G2 is updated so that the vertical bar graph G25 corresponding to the provisionally changed order is displayed. This enables the user to check a state of the vertical bar graph G25 before performing the drop, and hence the convenience of the user is enhanced. When the user does not like the checked vertical bar graph G25, the user can perform the drop in another place to cancel the change in the order, and is thus no longer required to perform an operation for restoring the original state, and hence the convenience of the user is enhanced.

For example, the order of the setting values may be changed through the drag-and-drop of the text part indicating each of "MAJOR ITEM," "INTERMEDIATE ITEM," and "MINOR ITEM" on the preview screen G2 illustrated in FIG. 5. In this case, the display position of the text part indicating each of "MAJOR ITEM," "INTERMEDIATE ITEM," and "MINOR ITEM" is changed without changing the display position of each setting value. The correspondence between each classification item and each setting value is changed, and hence the order of the setting values is changed. The update method itself for the vertical bar graph G25 to be performed after the order of the setting values is changed is the same as that in the at least one embodiment.

For example, the change operation for changing the order of the setting values may be received under a state in which the vertical bar graph G12 is displayed on the app screen G1. In this case, the app screen G1 corresponds to the aggregation screen. For example, when only an app administrator is permitted to save the setting values, the change operation for changing the order of the setting value may be received on a screen of the app administrator. In this case, the screen of the app administrator corresponds to the aggregation screen.

For example, the canceling operation for restoring the state exhibited before the drag-and-drop is performed may be performed.

For example, the same method may be applied to the aggregation of data on another screen that is not for use in a cloud service. Although it has been described that one of objects of the present disclosure is to alleviate an operation load on a user in a cloud service, it is also one of the objects of the present disclosure to alleviate an operation load on the user in another situation. The another situation may be a situation in which aggregated results are displayed offline instead of being displayed in the cloud. In this case as well, for example, a change in the order of the setting values may be received through drag-and-drop in offline spreadsheet software. As an aggregation method, a method of changing the setting value, and other methods to be used in this case, those described in the at least one embodiment may be used. In addition, for example, the same method as in the at least one embodiment may be applied to a situation in which an Internet service that is not called a cloud is used.

For example, each function described above may be implemented by any device in the cloud system 1. For example, the functions described as being implemented by the server 10 may be implemented by the user terminal 20. In this case, it suffices that the same functions as the setting module 101, the addition module 102, the deletion module 103, the aggregation module 104, the display control module 105, and the order changing module 106 are implemented by being executed by a script of the browser or by being executed by an application installed in the user terminal 20. For example, the functions described as being implemented by the user terminal 20 may be implemented by the server 10. For example, the functions may be implemented by one computer instead of being shared by a plurality of computers.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A cloud system, which allows aggregation of data in a cloud service, the cloud system comprising at least one processor configured to:

set a plurality of setting values relating to the aggregation based on a predetermined setting operation performed on an aggregation screen relating to the aggregation;

display, on the aggregation screen, aggregated results corresponding to the plurality of setting values and an order relating to the plurality of setting values;

change the order of the plurality of setting values based on a predetermined change operation performed on the aggregation screen;

update, when the order is changed, the aggregation screen so that the aggregated results corresponding to the changed order are displayed;

wherein the order indicates a display order of the plurality of setting values on the aggregation screen, change an aggregation method indicating how to aggregate the data based on a second change operation performed on the aggregation screen;

wherein the aggregation method is one of a number of records, a total sum, an average value, a maximum value, or a minimum value, wherein the aggregation screen comprises a preview screen for displaying provisional aggregated results corresponding to the plurality of setting values and the order, wherein the at least one processor is configured to:

display the provisional aggregated results on the preview screen;

display, on the preview screen, the provisional aggregated results using only a part of all aggregatable pieces of data which corresponds to the plurality of setting values, wherein a number of the part of all aggregatable pieces of data that are aggregated for the provisional aggregated results on the preview screen is dynamically determined with a predetermined ratio of a total number of the all aggregatable pieces of data;

update the preview screen so that the provisional aggregated results corresponding to a plurality of changed setting values is displayed using only the part of all aggregatable pieces of data every time at least one of the plurality of setting values is changed by the setting operation;

update the preview screen so that the provisional aggregated results corresponding to the changed order is displayed using only the part of all aggregatable pieces of data every time the order is changed by change operation; and display, on the aggregation screen, based on an applying operation that is performed on the preview screen, the aggregated results corresponding to the plurality of changed setting values and the changed order by aggregating more of the all aggregatable pieces of data than the preview screen.

2. The cloud system according to claim 1, wherein the at least one processor is configured to:

add a new setting value based on a predetermined addition operation performed on the aggregation screen; and delete a setting value selected from among the plurality of setting values based on a predetermined deletion operation performed on the aggregation screen.

3. The cloud system according to claim 1, wherein the at least one processor is configured to set three or more setting values, wherein the predetermined change operation comprises an operation for changing an order position of a setting value selected from among the three or more setting values, and wherein the at least one processor is configured to change the order so that the order position of the selected setting value is changed and a relative order between other ones of the three or more setting values is maintained.

4. The cloud system according to claim 1, wherein the aggregation screen is configured to display, for each of the plurality of setting values, a move image to be moved for changing an order position of the each of the plurality of setting values, and wherein the predetermined change operation comprises an operation for moving the move image corresponding to any one of the plurality of setting values.

5. The cloud system according to claim 4, wherein the at least one processor is configured to change, when a pointer overlaps with the move image, a display mode of an area of the aggregation screen corresponding to one of the plurality of setting values the order position of which is to be changed by the predetermined change operation.

6. The cloud system according to claim 1, wherein the at least one processor is configured to control, when a predetermined operation with respect to the aggregation screen is inhibited from being reflected, the display of the aggregation screen so that an operation image corresponding to the predetermined operation is prevented from being displayed.

7. The cloud system according to claim 1, wherein the at least one processor is configured to set the plurality of setting values respectively corresponding to a plurality of setting items relating to the aggregation, wherein the predetermined change operation comprises an operation for moving, on the aggregation screen, a setting value selected from among the plurality of setting values, and wherein the at least one processor is configured to control, based on the predetermined change operation, the display of the aggregation screen so that the selected setting value is moved without moving a position of each of the plurality of setting items.

8. The cloud system according to claim 1, wherein the order comprises an order relating to the plurality of setting values respectively corresponding to positions of a plurality of setting items.

9. The cloud system according to claim 1, wherein the predetermined change operation comprises drag-and-drop from a first area corresponding to any one of the plurality of setting values on the aggregation screen to a second area corresponding to another one of the plurality of setting values on the aggregation screen.

10. The cloud system according to claim 9, wherein the at least one processor is configured to:

provisionally change the order when the second area is specified on the aggregation screen before drop in the second area is performed; and update the aggregation screen so that the aggregated results corresponding to the provisionally changed order are displayed.

11. The cloud system according to claim 1, wherein the order indicates a hierarchy of the plurality of setting values.

12. The cloud system according to claim 1, wherein the data is aggregated as hierarchical data and the aggregated results are displayed in a hierarchical visualization according to the order.

13. The cloud system according to claim 1, wherein the aggregation screen includes a plurality of areas, each of the plurality of areas includes an input form that receives input of a type of any one of the plurality of setting values and parts for changing the display order, wherein the parts for changing the display order are buttons located within each of the plurality of areas; and the at least one processor is configured to change the order based on a user's operation to the parts.

14. The cloud system according to claim 1, wherein the at least one processor is configured to add a second aggregation method based on a third change operation performed on the aggregation screen.

15. The cloud system according to claim 1, wherein the part of all aggregatable pieces of data that are displayed are randomly selected.

16. An aggregated result display method for aggregation of data in a cloud service, the aggregated result display method comprising:

setting a plurality of setting values relating to the aggregation based on a predetermined setting operation performed on an aggregation screen relating to the aggregation;

displaying, on the aggregation screen, aggregated results corresponding to the plurality of setting values and an order relating to the plurality of setting values;

changing the order of the plurality of setting values based on a predetermined change operation performed on the aggregation screen;

updating, when the order is changed, the aggregation screen so that the aggregated results corresponding to the changed order are displayed;

wherein the order indicates a display order of the plurality of setting values on the aggregation screen;

changing an aggregation method indicating how to aggregate the data based on a second change operation performed on the aggregation screen;

wherein the aggregation method is one of a number of records, a total sum, an average value, a maximum value, or a minimum value;

wherein the aggregation screen comprises a preview screen for displaying provisional aggregated results corresponding to the plurality of setting values and the order, displaying the provisional aggregated results on the preview screen;

displaying, on the preview screen, the provisional aggregated results using only a part of all aggregatable pieces of data which corresponds to the plurality of setting values, wherein a number of the part of all aggregatable pieces of data that are aggregated for the provisional aggregated results on the preview screen is dynamically determined with a predetermined ratio of a total number of the all aggregatable pieces of data;

updating the preview screen so that the provisional aggregated results corresponding to a plurality of changed setting values is displayed using only the part of all aggregatable pieces of data every time at least one of the plurality of setting values is changed by the setting operation;

updating the preview screen so that the provisional aggregated results corresponding to the changed order is displayed using only the part of all aggregatable pieces of data every time the order is changed by the change operation; and displaying, on the aggregation screen, based on an applying operation that is performed on the preview screen, the aggregated results corresponding to the plurality of changed setting values and the changed order by aggregating more of the aggregatable pieces of data than the preview screen.

17. A non-transitory information storage medium having stored thereon a program for causing a computer, which allows aggregation of data in a cloud service, to:

set a plurality of setting values relating to the aggregation based on a predetermined setting operation performed on an aggregation screen relating to the aggregation;

display, on the aggregation screen, aggregated results corresponding to the plurality of setting values and an order relating to the plurality of setting values;

change the order of the plurality of setting values based on a predetermined change operation performed on the aggregation screen;

update, when the order is changed, the aggregation screen so that the aggregated results corresponding to the changed order are displayed;

wherein the order indicates a display order of the plurality of setting values on the aggregation screen;

change an aggregation method indicating how to aggregate the data based on a second change operation performed on the aggregation screen; and wherein the aggregation method is one of a number of records, a total sum, an average value, a maximum value, or a minimum value;

wherein the aggregation screen comprises a preview screen for displaying provisional aggregated results corresponding to the plurality of setting values and the order, display the provisional aggregated results on the preview screen;

display, on the preview screen, the provisional aggregated results using only a part of all aggregatable pieces of data which corresponds to the plurality of setting values, wherein a number of the part of all aggregatable pieces of data that are aggregated for the provisional aggregated results on the preview screen is dynamically determined with a predetermined ratio of a total number of the all aggregatable pieces of data;

update the preview screen so that the provisional aggregated results corresponding to a plurality of changed setting values is displayed using only the part of all aggregatable pieces of data every time at least one of the plurality of setting values is changed by the setting operation;

update the preview screen so that the provisional aggregated results corresponding to the changed order is displayed using only the part of all aggregatable pieces of data every time the order is changed by the change operation; and display, on the aggregation screen, based on an applying operation that is performed on the preview screen, the aggregated results corresponding to the plurality of changed setting values and the changed order by aggregating more of the all aggregatable pieces of data than the preview screen.

* * * * *